INVENTOR.
DONALD W. GARNETT
BY Whittemore, Hulbert & Belknap
ATTORNEYS

March 21, 1961 D. W. GARNETT 2,975,568

PACKAGING APPARATUS

Filed June 21, 1957 13 Sheets-Sheet 2

INVENTOR.
DONALD W. GARNETT
BY Whittemore, Hulbert & Belknap
ATTORNEYS

March 21, 1961 D. W. GARNETT 2,975,568

PACKAGING APPARATUS

Filed June 21, 1957 13 Sheets-Sheet 3

INVENTOR.
DONALD W. GARNETT
BY Whittemore, Hulbert & Belknap
ATTORNEYS

INVENTOR.
DONALD W. GARNETT
BY Whittemore, Hulbert & Belknap
ATTORNEYS

March 21, 1961 D. W. GARNETT 2,975,568

PACKAGING APPARATUS

Filed June 21, 1957 13 Sheets-Sheet 5

INVENTOR.
DONALD W. GARNETT
BY Whittemore, Hulbert & Belknap
ATTORNEYS

INVENTOR.
DONALD W. GARNETT
BY Whittemore, Hulbert & Belknap
ATTORNEYS

INVENTOR.
DONALD W. GARNETT
BY Whittemore, Hulbert & Belknap
ATTORNEYS

INVENTOR.
DONALD W. GARNETT
BY Whittemore, Hulbert & Belknap
ATTORNEYS

March 21, 1961 D. W. GARNETT 2,975,568

PACKAGING APPARATUS

Filed June 21, 1957 13 Sheets-Sheet 9

INVENTOR.
DONALD W. GARNETT
BY Whittemore, Hulbert & Belknap
ATTORNEYS

March 21, 1961 D. W. GARNETT 2,975,568

PACKAGING APPARATUS

Filed June 21, 1957 13 Sheets-Sheet 10

INVENTOR.
DONALD W. GARNETT
BY Whittemore, Hulbert & Belknap
ATTORNEYS

March 21, 1961 D. W. GARNETT 2,975,568
PACKAGING APPARATUS
Filed June 21, 1957 13 Sheets-Sheet 11

INVENTOR.
DONALD W. GARNETT
BY Whittemore Hulbert & Belknap
ATTORNEYS

March 21, 1961 D. W. GARNETT 2,975,568
PACKAGING APPARATUS
Filed June 21, 1957 13 Sheets-Sheet 12

INVENTOR.
DONALD W. GARNETT
BY Whittemore Hulbert & Belknap
ATTORNEYS

March 21, 1961 D. W. GARNETT 2,975,568

PACKAGING APPARATUS

Filed June 21, 1957 13 Sheets-Sheet 13

INVENTOR.
DONALD W. GARNETT
BY Whittemore, Hulbert & Belknap
ATTORNEYS 2,975,568
Patented Mar. 21, 1961

2,975,568

PACKAGING APPARATUS

Donald W. Garnett, Grand Ledge, Mich., assignor to The Olofsson Co., Lansing, Mich., a corporation of Michigan Filed June 21, 1957, Ser. No. 667,090

33 Claims. (Cl. 53—53)

The present invention relates to improved apparatus for packaging bulk merchandise such as potato chips in flexible receptacles such as bags of the plain envelope or side gusset type.

In general, the invention deals with apparatus of this sort having a sequence of provisions for insuring the presence of a supply of the bags in a stacked condition, with all open ends up; for periodically removing the endmost bag from the stack and delivering it to a conveyor for endwise travel beneath a filling device; for opening the bag during its advance and filling it with a measured charge of the intended fragile contents, while insuring a complete filling; for automatically rejecting bags which are imperfect or have an underweight or overweight content, without halting their travel; and for closing properly filled bags during continued advance and forwarding the same to appropriate sealing apparatus.

It is a general object of the invention to provide apparatus operating in the foregoing manner and including a bag supply device capable of handling a large quantity of stacked bags which are uniformly oriented open end up. The bags may be of either the plain envelope or side gusseted type, and, more particularly, of either a two-ply thickness at their sealed bottom or four-ply thickness due to a folded and sealed bottom seam. It is in the handling of bags of the last named, folded bottom sort that the invention has special merit, since the tendency of the bag stack to become unmanageable, by assuming a wedge shape on account of the cumulative increase in the thickness of its bottom as compared to the sum of the thicknesses of the two ply bag tops, is effectively controlled.

More specifically, it is an object of the invention to provide a bag supply unit or device of this character which employs simple sheet metal bag section dividers to accomplish the control just referred to. They guide groups of stacked bags for travel in generally horizontal guideways toward a bag pick-off point, each divider being filled with an appropriate number of bags. These sectional dividers are advanced longitudinally toward the pick-off point, adjacent which they fall away from the controlled bag group, by a relatively high frequency vibration of a channeled guide means supporting the same, the action being such as to maintain the bags in a free, non-jammed relationship in the respective dividers while causing the longitudinal advance of the successive dividers as described.

Another specific object is to provide a bag supply device as described, in which the section dividers are automatically separated gravitationally to free the bags as they approach the bag pick-off point.

A further object is to provide packaging apparatus of the character described, in which the endmost bag of an advancing section is removed therefrom by an improved vacuum type picker unit. This unit includes a hollow picker tube, the interior of which is connected to a source of vacuum, and which has an improved, recessed cross sectional outline along a face thereof which engages the endmost bag of a stack, such that the endmost bag is drawn into a concave, peripherally sealed face pocket of the tube under the vacuum effective internally of the tube. Hence wax or atmospheric pressure adhesion with a succeeding bag is broken and an unfailingly successful separation of the end bag from the supply stack is insured.

Another specific object is to provide a bag picker mechanism incorporating a picker tube as described, in which the tube is pivotally mounted to swing between the pick-off point of the bag supply device to a delivery point adjacent a bag forwarding mechanism, with improved valving provisions automatically controlling the vacuum in the picker tube in response to the swinging movements of the latter.

Another object is to provide apparatus as described, in which the bag, as so delivered by the picker tube, is advanced by an improved, continuously operating bag feeding conveyor, in the form of endless belts of the toothed, timer type which engage opposite sides of the mouth of the bag.

A further and more specific object is to provide a belt-type bag supply and feeding mechanism of this sort, and packaging apparatus of which the feed mechanism is a part, in which opposed timing belts as described are transversely apertured for sealed communication with a source of vacuum, thus to have a suction grip on the bag to positively control its forward travel.

A still further object is to provide a bag advancing and control mechanism of the above sort, in which the bag engaging belts are guided in a diverging and later converging path, so as to cause the bag mouths to be gradually opened during transport sufficiently to properly receive their intended charge, then automatically closed. An air blast is directed into the mouths of the bags as their opening commences at the divergent portion of the belt path, thus aiding in the full opening of the bags.

In this connection the invention further deals with improved means for slidingly guiding the belts, in the form of elongated tracks or ways of nylon or like flexible material which internally receive the respective belts and themselves communicate with a source of vacuum, and thus apply vacuum through the apertured belts to the bags during the belt travel.

As a further improvement under the invention, means are provided to adjust the lateral spacing of the timer belt reaches relative to one another, thus enabling the apparatus to accommodate bags of different sizes, and the flexible guide tracks accommodate lateral adjusting spread and return of the belt reaches, without requiring time consuming operations to mount and secure the guide tracks in their several adjusted relationships.

A further object of the invention is to provide, in association with bag advancing and opening means as described, improved means for filling the bags, including means for urging the material being packed, as potato chips downward to prevent retardation or stoppage of flow in its gravitational discharge into the bags. The improvement in this respect involves the use of non-circular filler rollers in part constituting the sides of a gravity filling hopper or funnel for the potato chips which hopper is transported longitudinally of the filler rollers, in longitudinally sliding relation thereto and in vertical alignment with the continuously advancing, opened bag.

A still further object is to provide apparatus of the above character in which a vibratory element acts rapidly within the mouth of the bag being filled, during the continuous advance thereof, in order to insure a proper and unclogged flow of the contents into the bag.

Yet another object is to provide such apparatus in which, in its longitudinal travel, the bottom of the bag is subjected to an oscillatory shaker action, thereby enabling the inertia of the falling chips to urge the sides of the bag outwardly, thus further insuring a proper volumetric capacity within the bag available to receive the intended, properly weighed contents.

A still further object is to provide packaging apparatus, as described, featuring a bag closing finger having a novel movement to assist the vacuum bag advancing belts in properly closing the bag mouth pior to its passage through a sealing unit.

It is another object to afford such bag packaging apparatus which has means to automatically eject from the advancing line bags whose content, as charged by the previously described arrangements, is under or overweight, or bags which are damaged or defective. The means to this end include a suitable, solenoid controlled memory unit or device operated in synchronism with the apparatus to cut off timing belt bag holding vacuum, as well as a mechanical kick-off member which displaces the improper bag from the line otherwise advancing to the sealer.

Other objects and features of the invention will become apparent as the description proceeds, especially when taken in conjunction with the accompanying drawings, illustrating preferred embodiments of the invention, wherein.

Figures 5, 6, 10, 11:
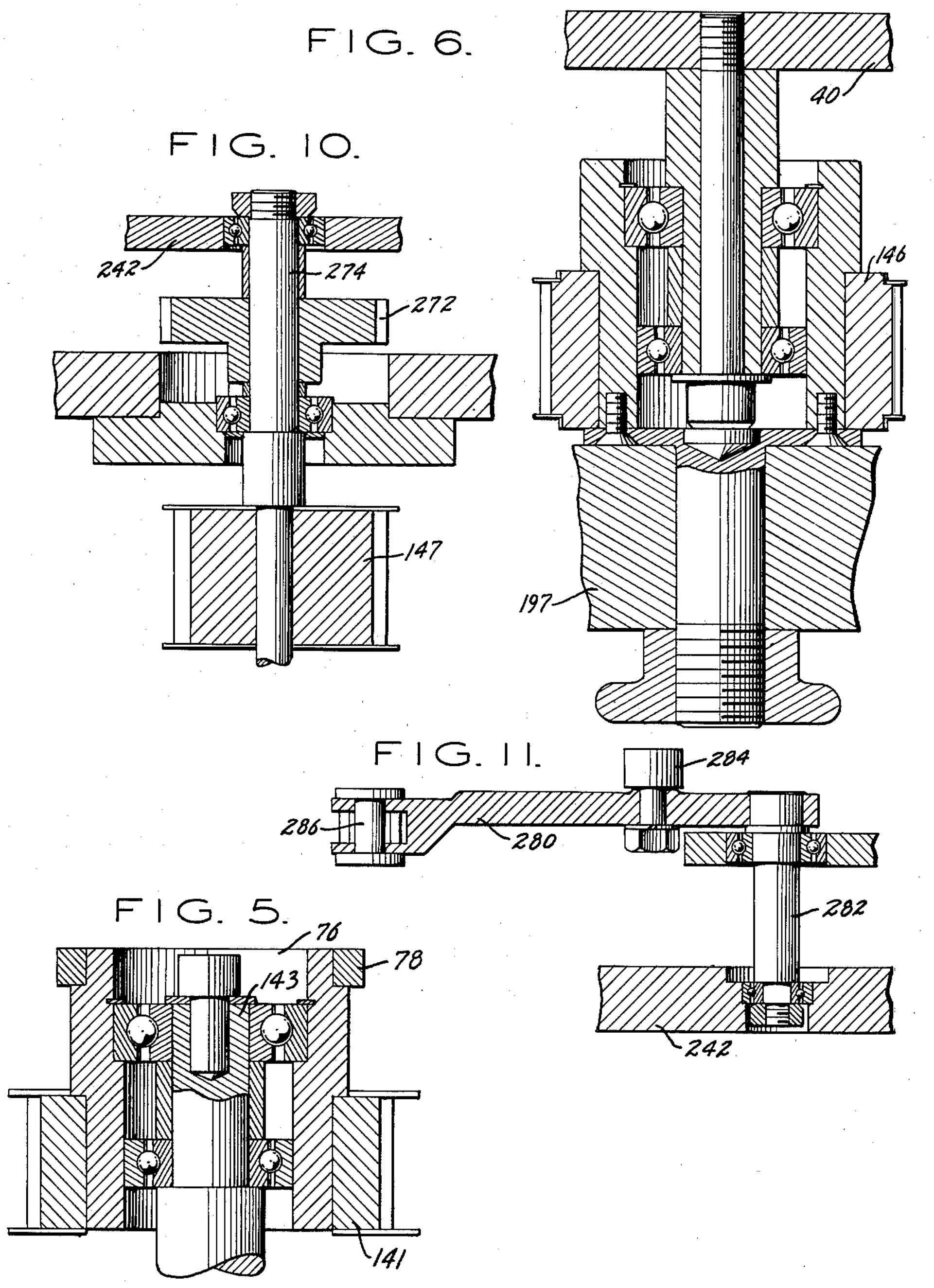
Fig. 5 is a fragmentary view in vertical section along line 5—5 of Fig. 2C.
Fig. 6 is a fragmentary view in vertical section along line 6—6 of Fig. 2D.
Figure 8:
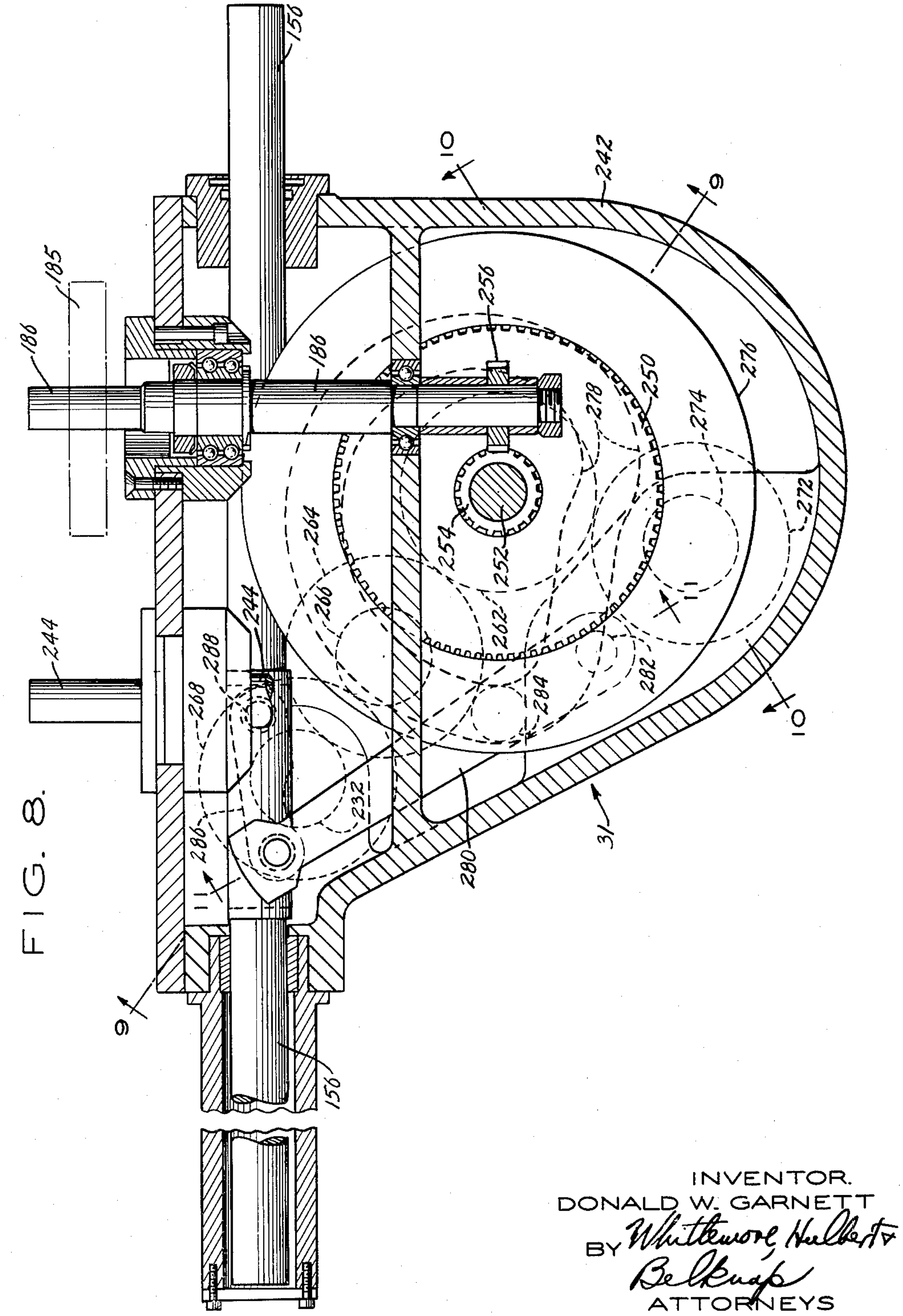
Fig. 8 is a view in horizontal section along broken line 8—8 through the gear box of Fig. 7, indicating the nature of the cam, gear and like provisions by which the operation of the apparatus is controlled practically throughout.
Figure 9:
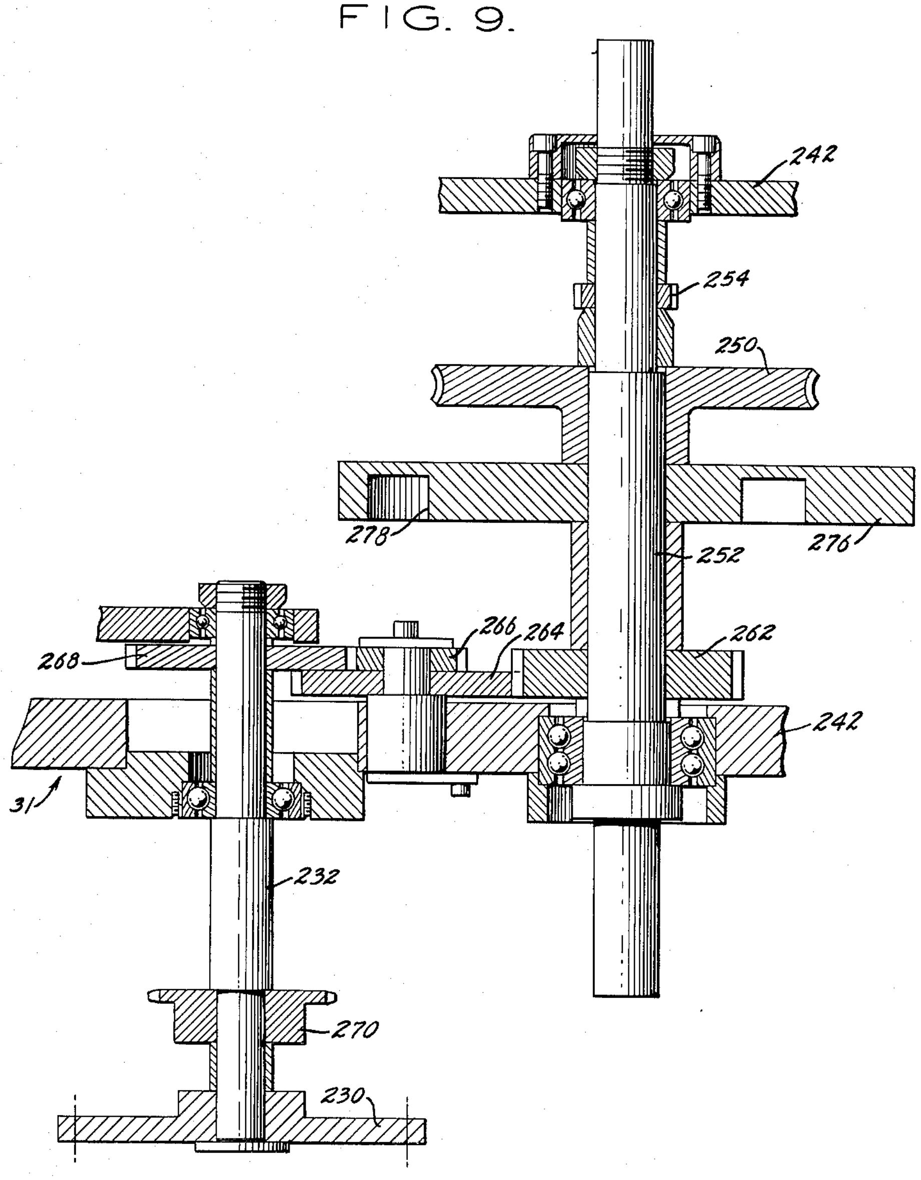
Figure 12:
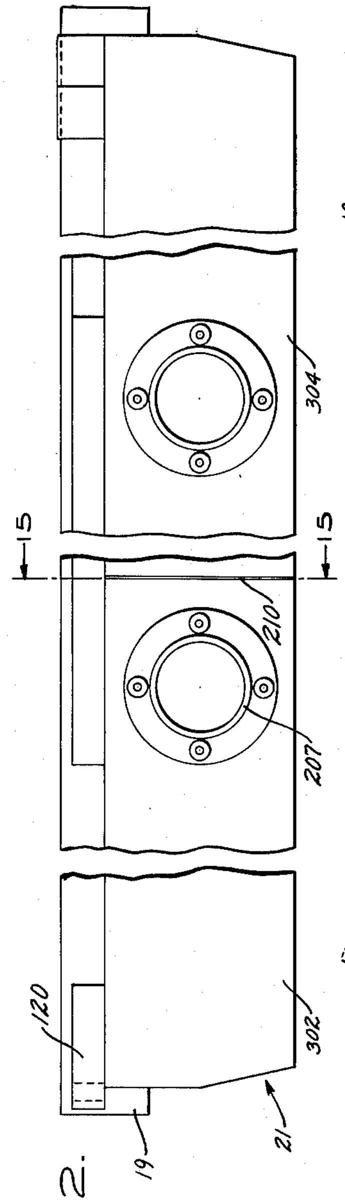
Figure 13:
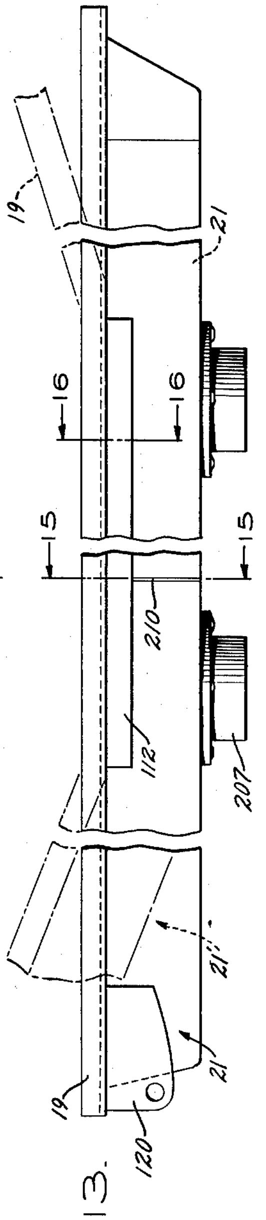
Figure 14:
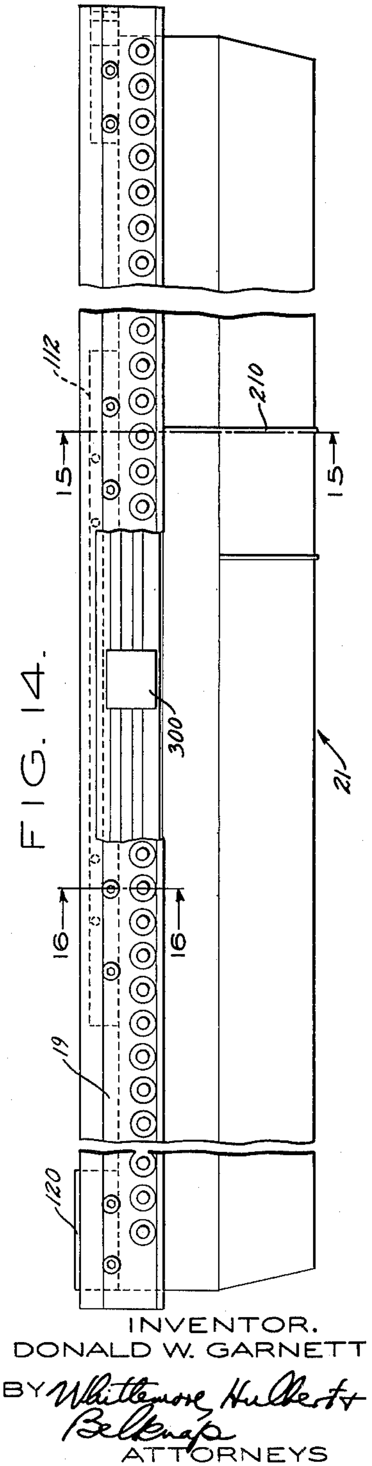
Figure 17:
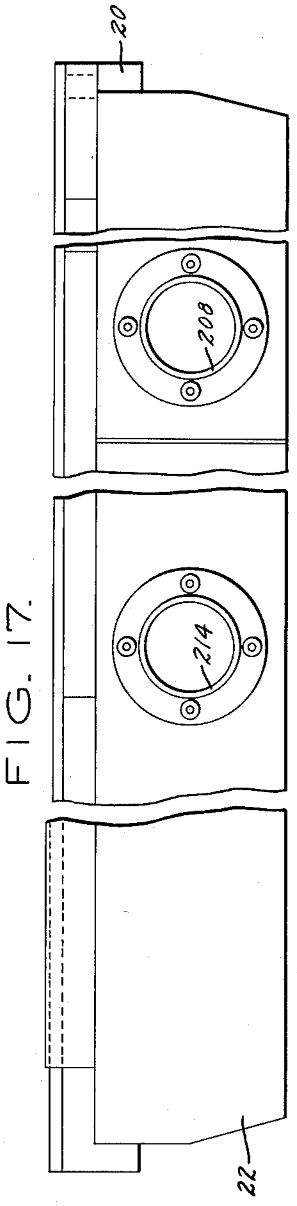
Figure 16:
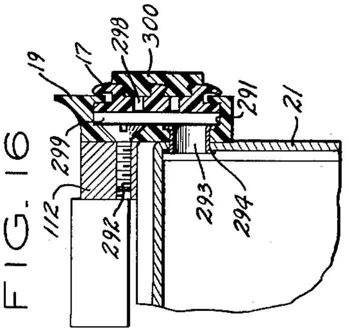
Figure 15:
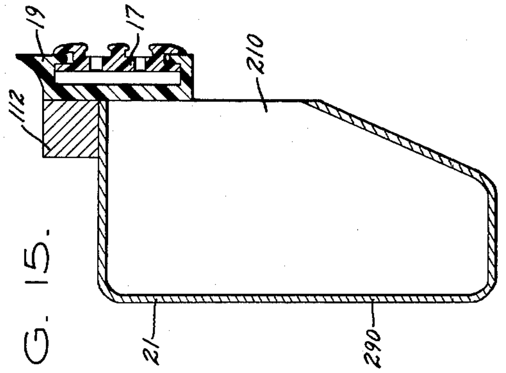
Figure 18:
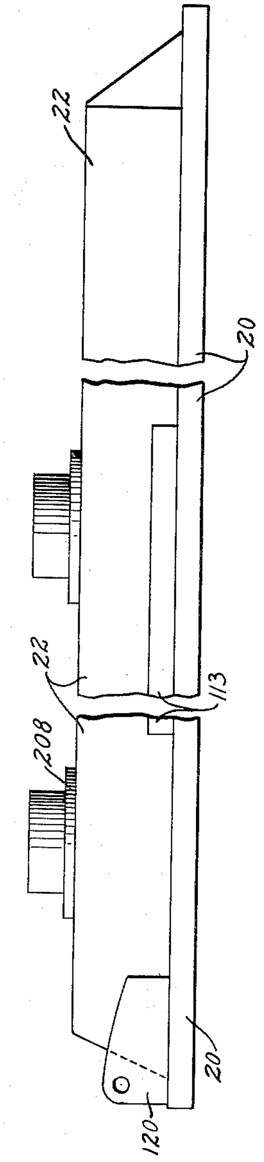
Figure 19:
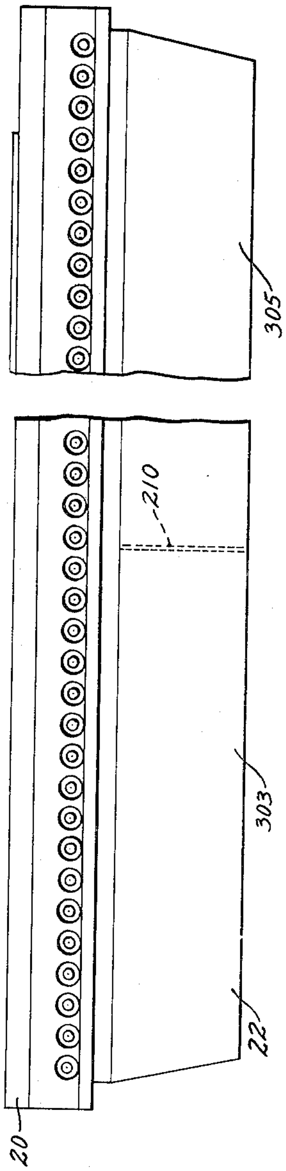

Figs. 9, 10 and 11 are, respectively, fragmentary views in section along the lines 9—9, 10—10 and 11—11 of Fig. 8;

Fig. 12 is a front elevational view, partially broken, of a front belt track guide and associated vacuum manifold;

Figs. 13 and 14 are, respectively, top plan and rear elevational views of the track and manifold unit of Fig. 12, also broken away;

Figs. 15 and 16 are views in vertical section on lines 15—15 and 16—16, respectively of Figs. 13 and 14, Fig. 16 being in somewhat enlarged scale; and Figs. 17, 18 and 19 are, respectively, rear elevational, top plan and front elevational views of the rear belt guide track and associated manifold of the apparatus, being partially broken away.

Figures 1, 2A, 2E:
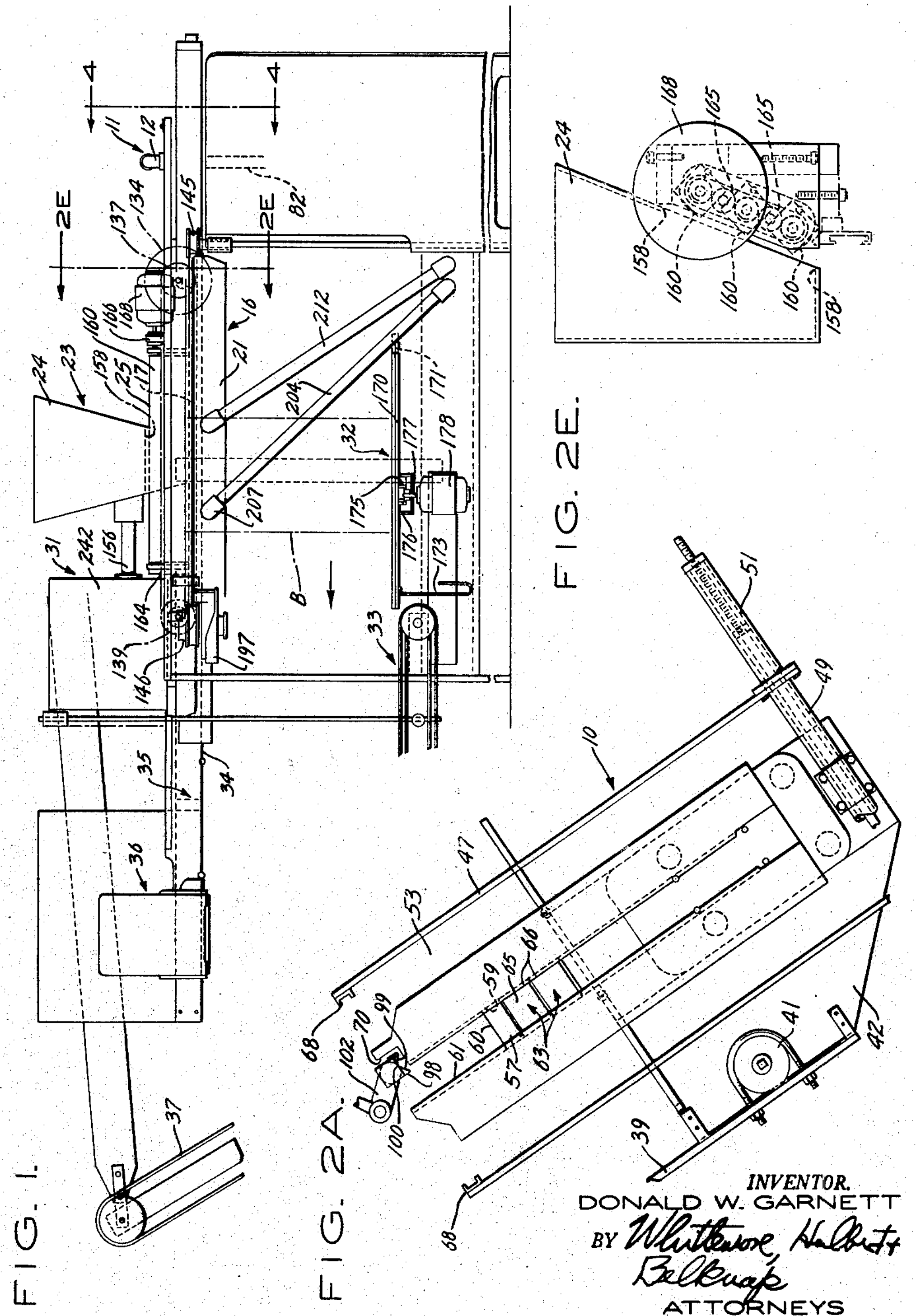
Fig. 1 is a view in front elevation of the apparatus, being schematic in character and only certain components being shown.
Figs. 2A, 2B, 2C and 2D are fragmentary top plan views showing in larger scale certain component units of the plan layout of Fig. 2, namely a stacked bag supply unit, a memory wheel unit, a bag picker unit and a belt guiding and adjusting unit respectively.
Fig. 2E is an end elevation of filling hopper and roller structure, as viewed from line 2E—2E of Fig. 1.
Figure 2B:
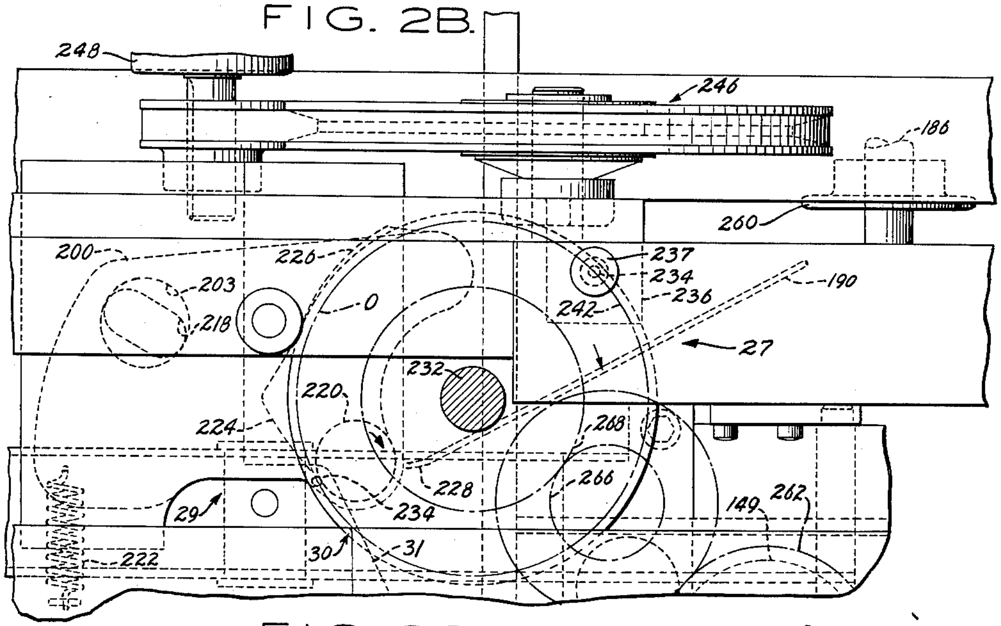
Figure 2C:
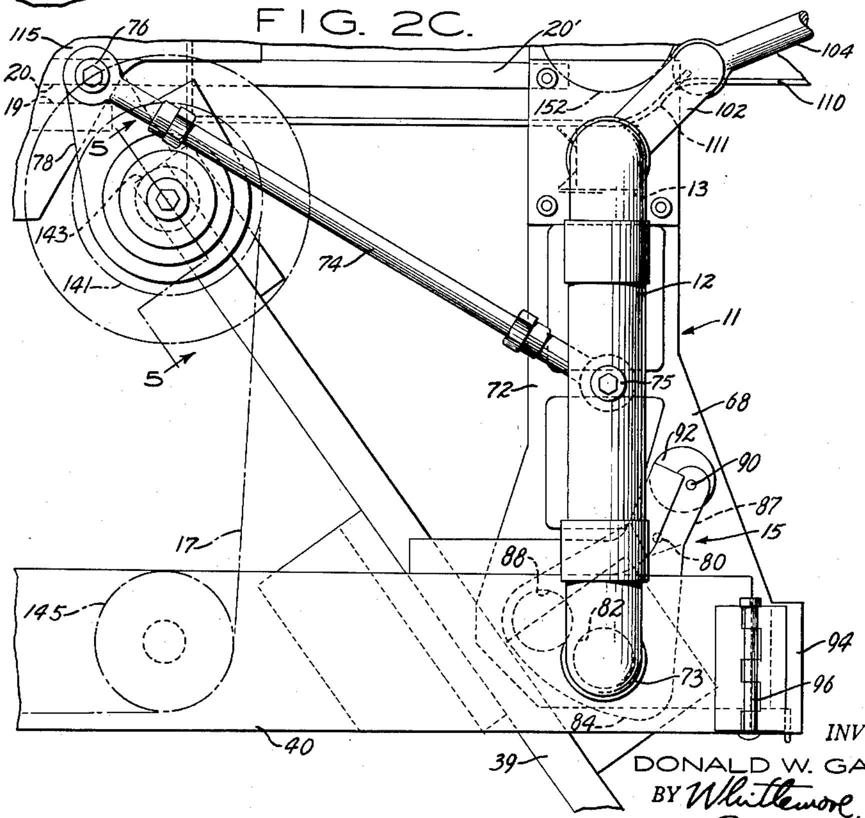
Figures 2, 2H, 4A:
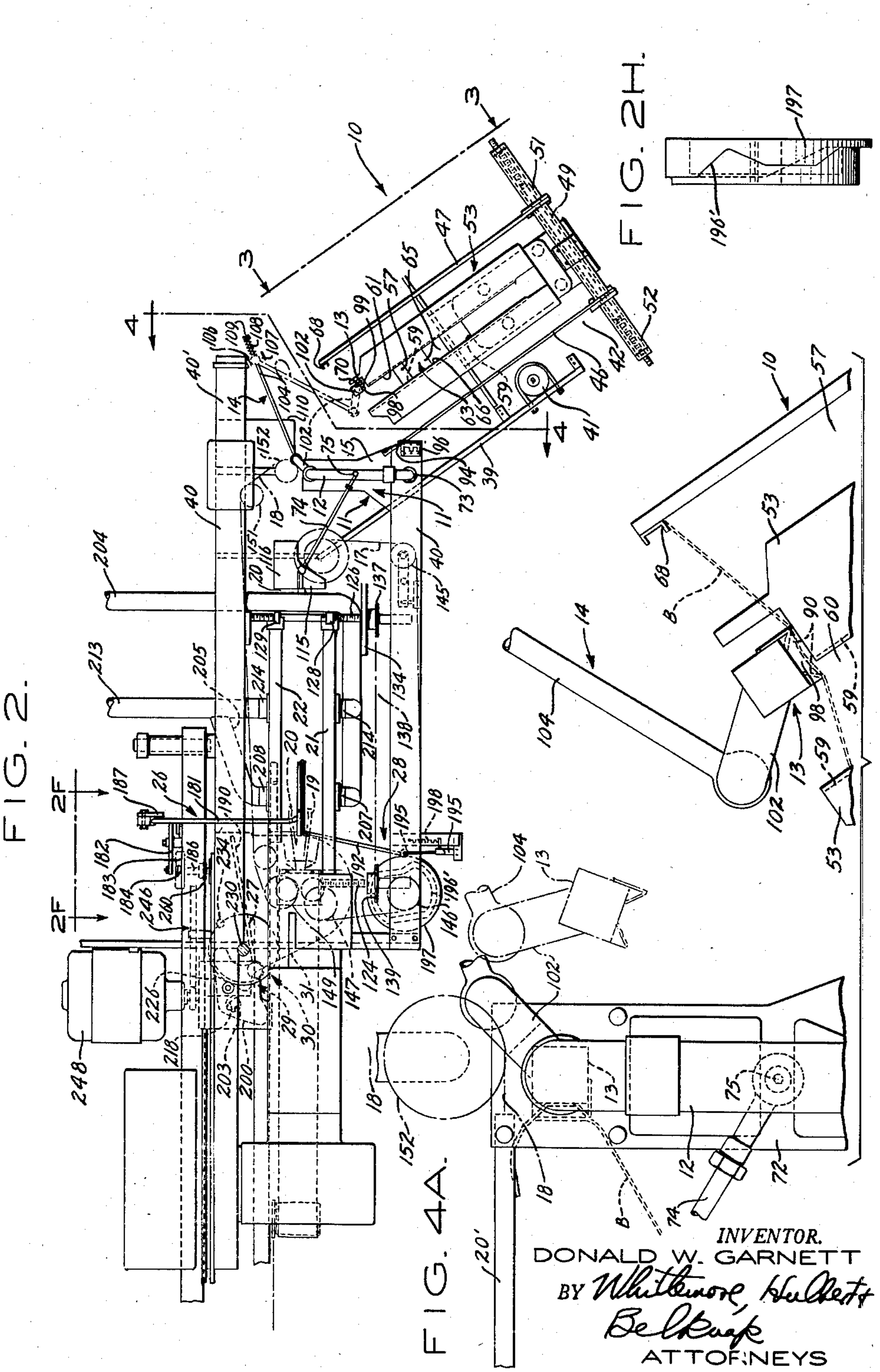
Fig. 2 is a top plan view showing the over-all layout of the apparatus, with some parts omitted in part for clarity.
Fig. 2H is a side elevation of the cam which actuates a bag closer arm.
Fig. 4A is a somewhat schematic plan view showing in larger scale the structure and operation of the bag picker unit.
Figures 2D, 2F, 2G:
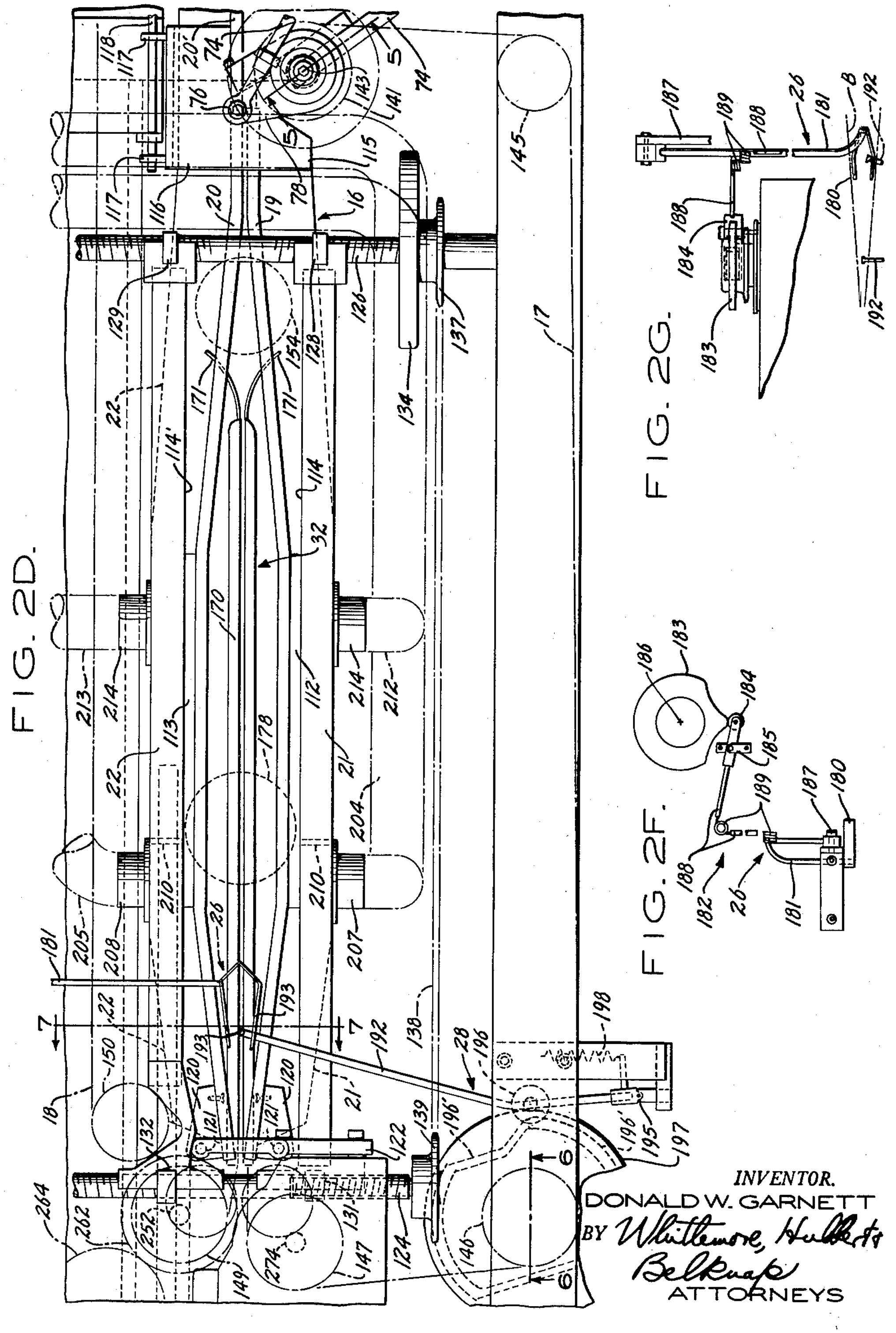
Fig. 2F is an elevation of a cam operated torsional linkage for the bag packer linkage, as viewed from line 2F—2F of Fig. 2.
Fig. 2G is a top plan view of the packer unit.

Referring to Figs. 1 and 2 through 2D of the drawings for a general layout of the apparatus, the basic components thereof include a vibratory bag supply unit or mechanism 10 (Fig. 2), having an improved sectional feed feature; and an automatic vacuum bag picker mechanism 11, featuring an oscillatory vacuum picker tube 12 equipped with an improved, vertically elongated vacuum picker head 13, with a linkage 14 controlling an individual movement of said head in the swing of tube 12, and a valve device 15 controlling the application and interruption of vacuum to the head 13 in its operation.

The apparatus also comprises a continuous feed mechanism 16 of the vacuum belt type for feeding bags in a longitudinal series, as delivered by the vacuum head 13, and this feed mechanism in general comprises improved front and rear vacuum transmitting timing belts 17, 18, respectively, traversing flexible front and rear guide tracks 19, 20, respectively (Fig. 2D), by which the path of travel of the belts 17, 18 is controlled and front and rear vacuum manifolds 21, 22, respectively, associated with those tracks. The mainifolds are also at least in part flexible.

There is also an improved filler hopper or funnel unit, generally designated 23 (Fig. 1), including a longitudinally reciprocatory funnel 24 and parallel, elongated, gear connected filler rollers 25, along the length of which the funnel is reciprocated. These rollers operate in a wall opening of the hopper and in effect constitute a part of the hopper.

As schematically shown, a vertically reciprocatory bag packer unit 26 (Fig. 2D) acts within the mouth of the advancing bag (as opened by the vacuum timing belts 17, 18 and filled by the hopper unit 23) to gently urge the contents downwardly in the bag and prevent jamming; and a kick-out device 27 is provided, whose purpose is to eject overweight, underweight or otherwise defective bags and their contents (under a memory control to be described). Furthermore, a reciprocatory bag closing device 28 (schematically shown) assists the vacuum timing belts 17, 18 in properly closing the bag.

A vacuum valve mechanism 29 has the function of interrupting the vacuum applied to the belts 17, 18 in case a defective or improperly charged bag is detected, hence is to be ejected by the kick-out device 27; and a memory unit 30 (Fig. 2B) operates under the control of suitable means (not part of the invention) to detect the defective bag condition and thus initiate operation of the kick-out device 27 and valve mechanism 29.

A gear case or box 31 contains gearing, cam and linkage provisions whereby the operation of the various instrumentalities above referred to is powered. A vibratory shaker trough mechanism 32 is provided, along which the bottoms of the advancing bags travel, the function of this device being to vibrate the bags and thus permit the inertia of descending contents to spread their side walls. A horizontally traveling belt conveyor 33, then supports the filled and closed bags from beneath, as they are advanced from the filling and closing instrumentalities, and suitable further instrumentalities are incorporated (but constituting no part of the present invention) by which the closed bag is sealed and delivered to a receiving point. These may include parallel horizontally traveling chains 34 engaging the closed mouths of the bags and assisted by a belt conveyor 33 in transporting the bags, a preheater unit 35, a sealer unit 36, and a cleated, upwardly inclined conveyor 37 to which the sealed bags are ultimately delivered for transport to a suitable disposal point. All of these devices are conventional.

The basic components of the apparatus, as generally outlined above, will now be described in only sufficient further detail to permit an understanding of their operation. The invention is not particularly concerned with their specific structural details. Similarly, the drawings depict, in the main, only general structural features and relationships, in the interest of simplicity.

*Bag supply unit or magazine*

Figure 3:
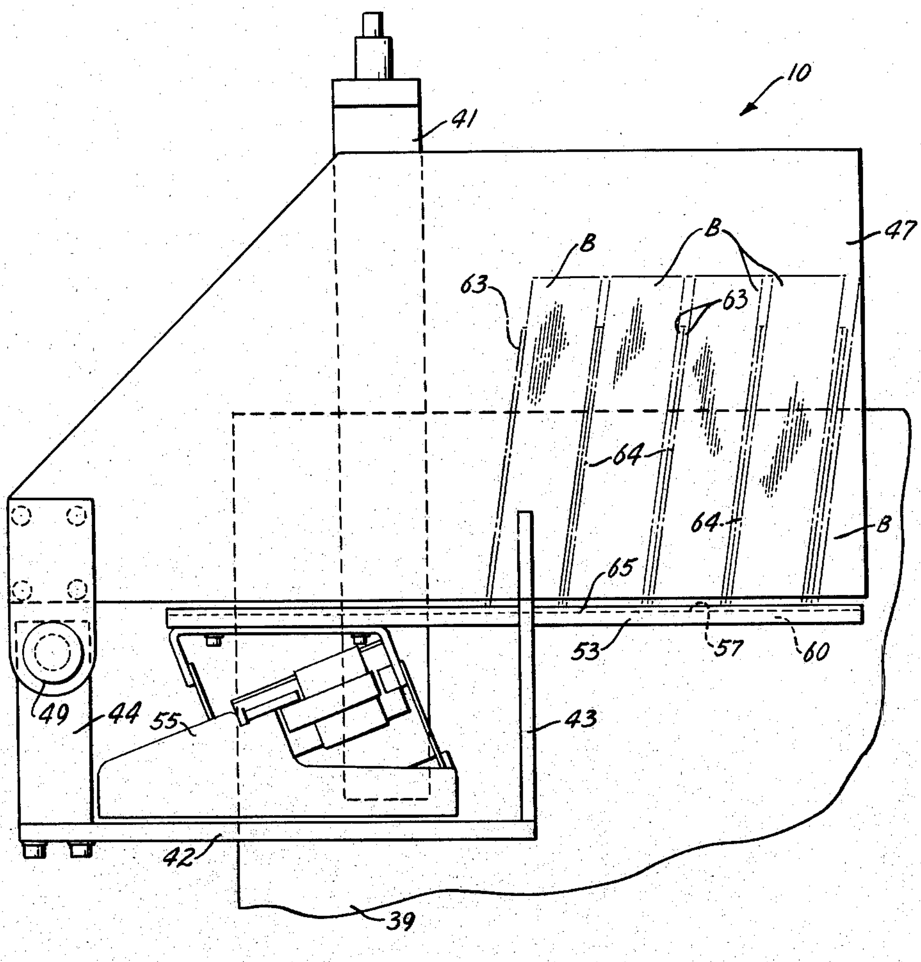
Fig. 3 is an angular and elevational view of the vibratory, sectional stack type, bag supply unit of the apparatus, as viewed from line 3—3 of Fig. 2, this unit appearing in plan at the right hand end of Fig. 2.

Referring to Figs. 2, 2A and 3, also in part to Fig. 4A, the mechanism 10 is supported on a suitable auxiliary frame plate 39 which is appropriately connected to the main frame work 40 of the apparatus, may be of a rigidly braced angle iron construction, with appropriate upright footing to support it. An upright tubular, threaded support structure 41 is carried by plate 39 to enable the vertical adjustment of the supply unit 10. Unit 10 comprises a horizontal bottom plate 42 supported by tube structure 41 for vertical adjustment and having upright fore and aft braces 43, 44 by which a pair of upright bag side guide plates 46, 47 are mounted. Plates 46 and 47 are laterally adjustable, so that flattened bags of different edge-to-edge widths may be accommodated.

For the purpose of the adjustment, a fixed horizontal inner rod or tube 49 is mounted on upright 44 at the rear of the feed mechanism 10, extending transversely thereof, and an outer sleeve 51 is slidable adjustable longitudinally of the tube 49, as by threaded engagement, being adapted to be secured thereon in any desired adjustment. The movable side plates 46 and 47 are carried by the sleeves 51 and 52.

An elongated horizontal floor plate 53 coacts with the side guide plates 46, 47 in defining a way or magazine along which stacked flat bags progress (in separated sections as hereinafter described); and this floor plate is vibrated at relatively high frequency by a conventional vibratory mechanism 55 of the syntron type supported on bottom plate 42, by which mechanism the plate 53 is mounted.

As indicated in Figs. 2A and 3, the vibratory floor plate 53 is formed to provide a centrally located, flat surfaced and depressed way 57 having undercut, mutually facing side channels 59 for a purpose to be described. At its forward end, the bottom of the central way 57 is cut back at 60 to provide a forward trap opening 61 therethrough.

The reference numeral 63 designates a bag divider in the form of a simple sheet metal element of U-shaped outline (shown in dot dash line in Fig. 3) provided with upstanding, forwardly inclined front and rear walls 64 and a connecting bottom 65 which is laterally flanged outwardly at its opposite sides, as indicated at 66 (Fig. 2A), the overall width of the bottom 65 equalling the distance across the bases of the channels 59. Thus, a series of the sheet metal dividers 63, each filled with a sectional stack of the flat bags B, uniformly oriented with mouths up, may be introduced into the bag way 57 between the side guide plates 46, i.e. 47, from the rear of the way, the flanges 66 of each divider sliding in the way channels 59 of the plate 53 of the magazine.

Vibration of the floor plate 53 by syntron unit 55 causes the bags to hug the bottom of the dividers 63 under moderate and uniform front-to-rear compression and uniform side-to-side distribution therein, while the dividers advance steadily forwardly. Use of the stack dividers 63 enables the apparatus to handle with equal efficiency and without jamming bags of the plain bottom or folded bottom type. Unless controlled by the dividers to advance in relatively small, relatively loosely confined groups, the bags assume the shape of an unmanageable pile preventing effective further transfer thereof.

Referring now particularly to Figs. 2 and 2A of the drawings, each of the bag side guide plates 46, 47 is equipped at its forward or outer end with an inwardly projecting upright stop 68. As the filled dividers 63 progress along the way 57 and reach the trap opening 61 they fall therethrough, freeing the bags therein, which continue to progress along the top of floor plate 53 to the stops 68. It is at this point that they are picked up by the automatic vacuum picker mechanism 11; and therefore the floor plate is cut away at 70 to accommodate the picker head 13 in its pick-up position.

*Vacuum picker unit*

Particular reference should be made to Figs. 2, 2C, 4, 4A and 5 of the drawings. As stated above, this mechanism 11 is essentially constituted by the picker head 13, the control linkage 14, the swinging vacuum tube 12 carrying the head, and the valve mechanism 15.

The vacuum tube 12 is of inverted U-shape (Fig. 4) being fixedly mounted on an oscillatory arm 72 appropriately pivoted at 73 on one side of the machine frame work 40, and adjacent the rear thereof in reference to the direction of travel of bags through the apparatus. The arm 72 is appropriately apertured to place the same in sealed communication with the tube 12, and oscillation of the arm 72 and tube 12 is effected through a connecting rod 74 pivotally connected to the arm at 75, which rod has its opposite end pivotally connected at 76 to a rotative crank 78 (see Fig. 2C). Crank 78 is rotated by the timing belt 17 in a manner to be described.

Figure 4:
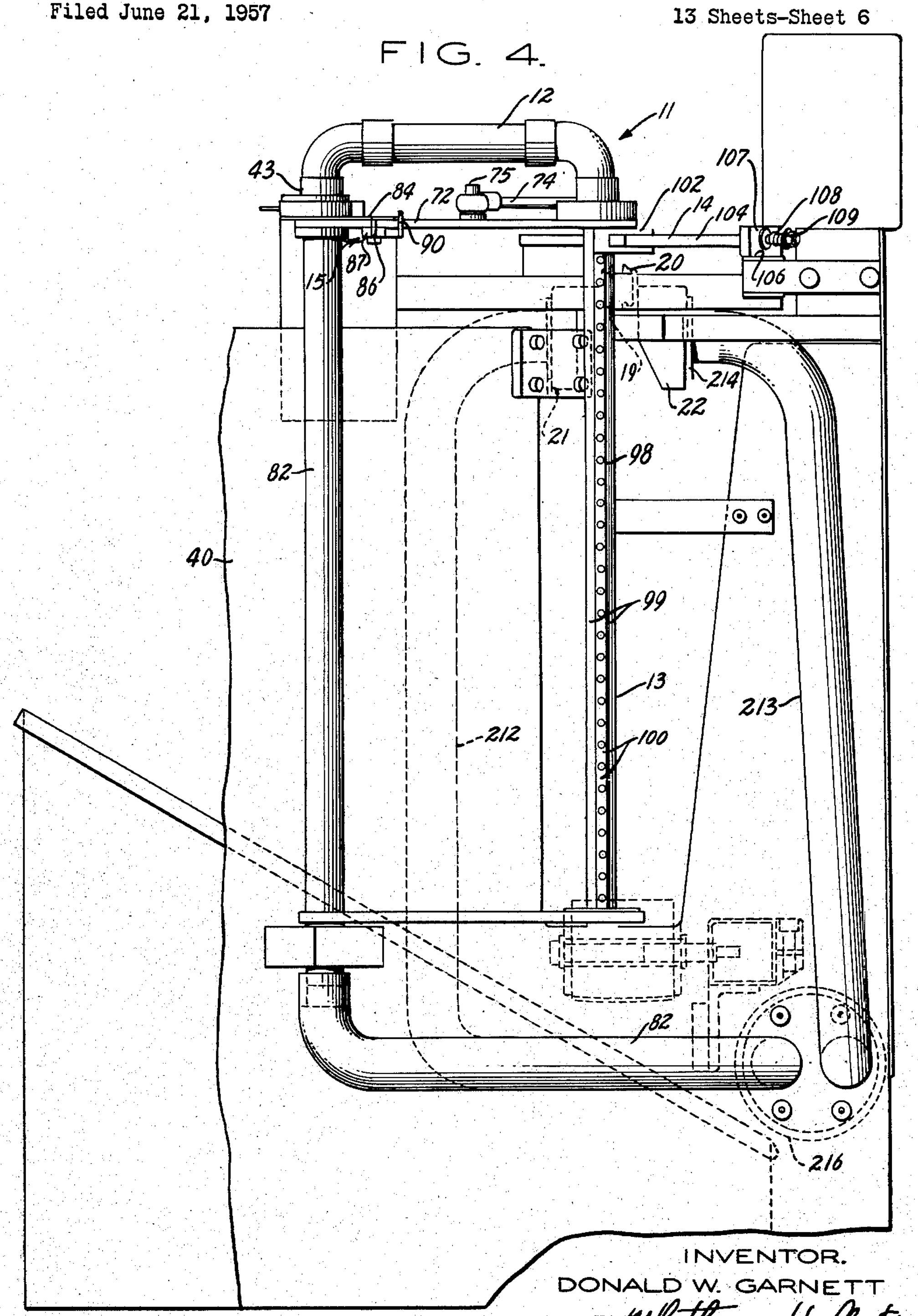
Fig. 4 is in end elevation of the apparatus proper, in particular of its vacuum bag picker unit and excluding the bag supply unit of Fig. 3, as viewed from the line 4—4 of Figs. 1 and 2.

As shown in Figs. 2C and 4, the pivoted leg of the inverted U-shaped vacuum tube 12 is in vertical alignment with an upright vacuum supply line 82, and a thin swingable valve plate 84 of plastic material is disposed between the oscillatory arm 72 (to which tube 12 is fixed) and the upper end of vacuum line 82. The valve plate 84 is of the generally triangular outline shown in Fig. 2C. It is individually pivoted on arm 72 at 86, and has a metal extension tab 87 fixed thereon adjacent its apex, whereby to derive its individual swinging movement to control vacuum.

Valve plate 84 is provided with an offset valve port 88 of the same diameter as tube 12, being otherwise imperforate; and it is seen by reference to Fig. 2C that in the position of the plate 84 shown therein the valve port 88 is displaced from communicative register with the vacuum tube and supply line 82. Upon counterclockwise swing of the valve plate, the valve port 88 is brought into register and vacuum is established between vacuum line 82 and the tube 12 and its associated vacuum picker head 13.

In order to operate the valve 84 its extension tab 87 is provided with an upright pin 90, which pin is alternately engageable, as it and valve plate 84 are bodily swung by oscillatory arm 72, with a fixed stop 92 carried by frame 40 and a further stop 94 pivoted on the frame by hinge 96. Engagement of pin 90 with the stop 92 swings the valve plate 84 to the vacuum-interrupt position of its port shown in Fig. 2C; opposite swing of arm 72 to engage the pin with adjustable stop 94 shifts the valve to vacuum-establish position. In the event it should be desired to operate the apparatus without feeding bags B therethrough, the stop 94 may be swung about its hinge 96 to a position in which it will not be struck by the pin 90, hence vacuum will not be applied to the picker head 13.

The picker head is individually pivoted on the free end of oscillatory tube 12, i.e. coaxially of the down turned leg thereof and in vacuum communication therewith, with appropriate provisions to maintain a vacuum seal between head and tube during pivoting of the head about this axis in a way which will be described. Picker head 13 is of the improved construction shown in Figs. 4 and 4A. It, is in the main, of a rectangular box-like shape in horizontal cross-section, being of a vertical length as great as any size of bag B to be handled. It has a special recessed picker face 98 defined by spaced triangular shoulders 99 extending the vertical length of the face, and the face recess afforded by these shoulders is vacuum sealed at the top and bottom thereof. Vertically spaced vacuum ports 100, or an equivalent vertical vacuum slot, are formed along the length of face 98 enclosed by the shoulders 99, communicating the picker face recess with its vacuum interior.

It is seen that, with the picker head 13 in its pick-off position, shown in solid line at the right in Fig. 4A, the endmost bag B at the pick-off station is engaged by the shoulders 99, vacuum within the head 13 being effective to draw the bag into the face recess between said shoulders, as a preliminary to removing the bag from the stack. This separates the bag edges from the chute side plates 46, 47, also breaking any wax or atmospheric adhesion of the engaged bag B with a succeeding bag and insuring unfailing and uniform stripping of the bags in the operation of the apparatus.

The linkage 14 responsible for the individual pivoting of picker head 13 in its bodily motion is comprised (see Figs. 2 and 4A) of an arm 102 pivotally connecting the head with one end of an elongated link 104 which is slidably guided adjacent its opposite end by a guide lug 106, the link itself being pivotally mounted at 107 on an extension 40' of the frame 40. A coil spring 108 surrounds link 104, acting between the lug 106 and an enlarged end head 109 on the link.

It is seen by reference to Fig. 4A that as the picker head 13 is bodily swung counter clockwise with vacuum tube 12 from the bag engaging position at the right, shown in solid line, to a bag delivery position at the left also shown in solid line, that the head 13 partakes of an independent pivoting relative to the tube, through the action of control linkage 14, in passing through the intermediate dotted line position. Hence at the ultimate delivery point at the right hand end of the vacuum timer belt 18 the adjacent end of the delivered bag is properly curled against belt 18, to be picked up and advanced by that belt. As the delivery point is reached, the vacuum in tube 12 and picker head 13 is interrupted by the valve plate 84, in the manner described.

A leaf spring 110 (Fig. 2C) on end extension 20' of belt guide is located just below track 20, being supported by an extension 40' on main frame 40 (Fig. 2). In order that the bag transfer from picker head 13 to the correct position on timer belt 18 may be made accurately, linkage 14 is so designed that the forward longitudinal motion of picker head 13 effectively matches the forward motion of the timer belt during the transfer portion of the cycle. To prevent the flexible bag from being drawn prematurely by vacuum to the timer belt, the leaf spring 110 extends forward of the timer belt 18 holding the bag clear of the latter. When picker tube 12 nears the position at which transfer of the bag is required it contacts a cam portion 111 of leaf spring 110, quickly depressing the same and thus allowing bag B to come in contact with timer belt 18 for accurately positioned transfer.

*Vacuum timer belt feed mechanism*

As stated, this mechanism 16 (Fig. 2D) in general comprises the special, endless front and rear flexible timer belts 17, 18, respectively, the vacuumized guide tracks 19, 20 of nylon or like wear resistance and flexible plastic, and associated vacuum manifolds 21 and 22, which are also flexible for lateral adjustment, at least at the ends thereof. Structural features of these members will be described in greater detail in connection with Figs. 12 through 19 of the drawings. It suffices for the present to understand that the belts 17, 18 are toothed on their enclosed inner surfaces, so as to be positively driven by meshing pulley gear teeth; and they are provided between their longitudinal edges with groups of longitudinally spaced, laterally extending apertures for vacuum communication with the interior of the manifolds 21, 22.

As belts 17, 18 travel they are positively restrained by and guided through the flexible tracks 19, 20, being caused to diverge, then travel longitudinally in substantially spaced relation, then converge, as shown in Fig. 2D, vacuum being applied (selectively in respect to a portion of the manifold length, as will be described) during this travel. The bag, gripped by the belts is thus gradually opened at its mouth, admitting air to the bag gradually so as not to weaken the belts' vacuum hold on it.

In order to adjust the vacuum belt feed unit 16 for bags of different widths across their mouth, as spread, provision is made to vary the lateral spacing of the respective front and rear belt guide tracks 19, 20, and manifolds therefor. To this end the flexible tracks are mechanically connected to the respective manifolds 21, 22 by tubular vacuum communicating rivets or grommets (to be described), as well as to rigid connector bars 112, 113, which extend only a relatively short distance along the manifold length at the longitudinal midpoints thereof. The ends of the tracks are thus permitted to flex laterally as the spacing of the manifolds is adjusted by the means to be described. The manifolds are also flexible in nature, being fabricated at least in part (and particularly at the ends thereof) of a flexible air tight material. Suitable, longitudinally extending, front and rear bracing and adjusting bars 114, 114' are attached to the manifold and track connector bars to effect the flexing adjustment.

The lateral flexure of tracks and manifolds is of course attended by some longitudinal movement of the tracks 19, 20; and this is accommodated by suitably coupling brackets 115, 116 mechanically for movement as a unit. The brackets are longitudinally guided by apertured lugs 117 on the bracket 116, which lugs extend laterally and are slidable on a fixedly mounted guide rod 118. Guide rod 118 is attached to a suitable projection from main frame 40.

The respective manifolds and belt guides tracks are mounted at their opposite, left-hand end to accommodate the longitudinal shift referred to above, by means of bracket blocks 120 secured to the tracks and appropriately pivoted at 121 to a longitudinally slidable bracket 122 on appropriate supporting frame work.

Relative lateral adjustment of the respective front and rear manifolds 21, 22 (which occasions the need for the longitudinal track movement just described) is effected through transversely extending, reversely threaded adjusting rods 124, 126 suitably journalled adjacent the opposite longitudinal ends of the tracks. As shown in Fig. 2D, the front manifold and track brace bar 114 carries a right hand collar 128 threadedly engaging a front portion of the thread of the rod 126; while the rear brace bar 114' carries a similar collar 129 threadedly engaging a rear, oppositely threaded portion of the rod 126.

Similarly, the opposite longitudinal ends of bars 114, 114' carry collars 131, 132 which are in threaded engagement with reversely threaded portions of the rod 124. Adjusting rod 126 is provided with a knurled hand wheel 134 to rotate it in either direction; and a sprocket 137 secured on the rod 126 is connected by a chain 138 with a sprocket 139 fixed on the other rod 124, whereby the track and manifold means are transversely shifted simultaneously for adjustment of their center spacing.

As shown in Figs. 2C, 2D and 5, the front vacuum timer feed belt 17, structural details of which are shown in other figures, is trained about a toothed pulley 141 mounted for rotation about a fixed vertical pivot stem 143, and picker arm oscillating crank 78 is in coaxial and fixed relation to belt pulley 141, whereby the crank is positively rotated with front timer belt 17 and pulley 141 as its driver. To the front of the pulley 141 the belt 17 is trained about an adjustable toothed idler pulley 145, whence it extends longitudinally about a further toothed pulley 146, thence rearwardly about a toothed belt driving pulley 147, the drive for which will be hereinafter described. Between the longitudinally spaced toothed pulleys 147, 141 the rear, bar gripping reach of the belt 17 travels within and is positively guided for the major portion of its length by the channeled flexible vacuum track 19. Belt driven pulley 146 serves as a driver for a rotary bag closing cam, to be described.

The drive for the rear vacuum conveyor belt 18 is derived from a toothed pulley 149 (whose actuation is also hereinafter referred to). It is located in adjacent, rearwardly spaced relation to the front belt driving pulley 147, and from pulley 149 the belt 18 travels about a toothed idler pulley 150, thence longitudinally to the rear of the rear manifold 22 and about a further adjustable idler 151 (Fig. 2) and a fixedly journaled toothed idler 152. Idler 152 positions the right hand bend of vacuum timer belt 18 adjacent the delivery point of the vacuum picker head 13, and at this zone the belt 18 enters into the back extension 20′ of the rear belt guide track 20. Here it is subjected to vacuum so as to pick the adjacent end of the bag B from the de-vacuumized picker head 13 and begin the advance of the bag B through the belt spreading operation. As the bag progresses into the initial zone of divergence of the guide tracks 19, 20, its mouth gradually opening, it may be subjected to an auxiliary opening blast from a vertical blower throat such as is indicated in dotted line in Fig. 2D and designated 154.

*Reciprocatory bag filling hopper*

Referring now to Figs. 1 and 2E of the drawings, the hopper unit 23, as pointed out above, in general includes a funnel 24 into which charges of the potato chips, measured by means not germane to the invention, are introduced. This funnel is reciprocated longitudinally of the apparatus, at different forward and reverse rates, through the agency of a reciprocating plunger rod 156 (see also Fig. 8) actuated in a manner hereinafter described. One of the longitudinal side walls of the funnel is cut away, as at 158, and in this space there is received a stack of three horizontal elongated and vertically arranged filler rollers 160 of square cross sectional outline, the rollers thus constituting a part of the hopper rear wall structure.

The filler rollers 160 are drivingly interconnected at one end by gearing 164 interspersed by idlers 165 (Fig. 2E), so that all three rollers have their forward sides rotating downward, one roller having an independent drive through a suitable coupling 166 from an electric motor 168; and upon rotation they act to urge the descending chips downward and prevent possible clogging adjacent the discharge end of the funnel 24.

*Bag shaker trough*

This mechanism, generally designated 32 and also shown best in Fig. 1, includes a shallow, elongated sheet metal trough 170 which is, in vertical section, of V-shaped outline. It has a pair of divergent curved guide fingers 171 at its right hand end, into which the bottom of the bag B as transported by the belts 17, 18, is introduced. It is supported by a round wire-type spring 173 adjacent one end thereof, and is rapidly vibrated by a rotary counterweighted eccentric 175, which operates in a housing 176 secured to the bottom of the trough 170. The eccentric is fixedly mounted on the shaft 177 of an electric motor 178, with the eccentric connection angularly spaced 180° from the counterweight 175. Suitable provisions may be made to adjust the height of mechanism for bags of different size.

The rapid oscillatory action of the motor driven counterweight imparts to the trough 170 a high frequency shaking movement, which is effective upon bags being filled to cause the inertia of the falling chips to spread the bag sides, particularly adjacent the bottom of the bag. This insures that the available volume of the bag is always fully occupied, and that there is room to receive the measured charge.

This unit, generally designated (see Figs. 2, 2D, 2F and 2G), includes a sheet metal packer blade 180 which is, in horizontal cross section, of the generally U-shaped outline shown. It is connected by a transverse operating rod 181 to a suitable torsional type motion converting linkage, generally designated 182; and this linkage is operated by a rotative plate cam 183 secured on a laterally extending horizontal shaft 186 which is powered from the gear case 32 (Fig. 8) in a way to be described.

A cam follower roller 184 engages the shaped plate cam 183, which is of a lobed outline such as to cause the packer blade 180 to be actuated through torsion spring loaded linkage 182 and rod 181 to enter the open mouth of a bag, make two rapid cushioned vertical strokes within the same and withdraw from the bag, all as the bag is being moved between the timer belts 17, 18. This has the effect of settling the last portion of the charge of chips properly within the bag, and leaving enough vertical space at the bag mouth for proper subsequent sealing.

The linkage 182 is a torsion spring type and, as best shown in Figs. 2F and 2G, includes a fixedly supported pivot 185 for cam follower roller 184, as well as a fixed pivot at 187 for the packer rod 181 itself. Angularly related operating arms 188, resiliently articulated to one another by torsion springs 189, are connected to the roller 184 and rod 181 to effect the necessary directional motion of the latter. The springs 189 act both as cushioned pivots and to maintain engagement of follower 184 with cam 183.

*Bag kick-out mechanism*

The mechanism 27, as more or less schematically shown in Figs. 2 and 2B comprises an elongated kick-out rod 190 adapted to be swung through a sufficient stroke in a horizontal plane to engage and eject a bag from the traveling line of bags in the event the bag and/or contents are defective or inacceptable for any reason mentioned above. The actuation of this arm for the stated function involves the operation of the memory unit 30 and is coordinated with the action of the vacuum valve device 29, both hereinafter described in detail. Hence further description of the kick-out mechanism 27 is deferred.

*Bag closing unit*

The function of the bag closing unit 28, shown in Figs. 2 and 2D is to initiate the collapse of the mouth of the filled bag B by mechanically spreading it lengthwise, thus assisting the belts 17, 18 in effecting a properly sealable closure of the mouth. Unit 28 comprises an elongated transverse, horizontally disposed rod 192 having a downturned free end extension 193 located centrally of the path of bag travel. Rod 192 is adapted to be vertically operated to project the extension into the open bag mouth, as the bag is traveling longitudinally under the control of belts 17, 18. In this action, extension 193 makes a forward stroke in the direction of bag travel to engage and shift forwardly the forward edge of the bag mouth, then retracts upwardly to clear the contents, then retreats a partial stroke rearwardly, then projects downwardly into the bag and holds this position as the bag advances to engage and spread out in that direction the trailing edge of the bag. After this the rod 192 moves forward with the bag and withdraws upwardly and out of the bag mouth, whereupon the belts 17, 18 complete the flattening of the mouth.

A compound motion of the rod extension 193 as described is derived by providing a universal pivotal mount 195 for the rod 192 at its opposite end (Fig. 2D), with a cam follower roller 196 on the rod engaging in a suitably contoured cam track 196′ of the cylindrical, rotary drum-type cam 197. It will be evident to those skilled in the art that the cam track will have radial rises and valleys to accomplish the longitudinal shifting of the rod 192, as well as a suitable, circumferentially continuous axial contour to accomplish the vertical insertion, longitudinal travel and retraction of the rod relative to the bag mouth described above. A coil spring 198 is connected to a pin fixed on the bag closing rod 192 to urge its follower 195 against cam 197. See Fig. 2H for cam 197.

Rotation is imparted to cam 197 from the front belt sprocket 146 (See Figs. 2D and 6), to which it is coaxially secured, so that it is seen that the front vacuum timing belt 17 has two functions in addition to that of bag control, i.e., of actuating the bag closing unit 28 and of operating the crank 78 for the vacuum picker head 13 of the mechanism 11 (Fig. 2C).

*Vacuum valve unit*

Figure 7:
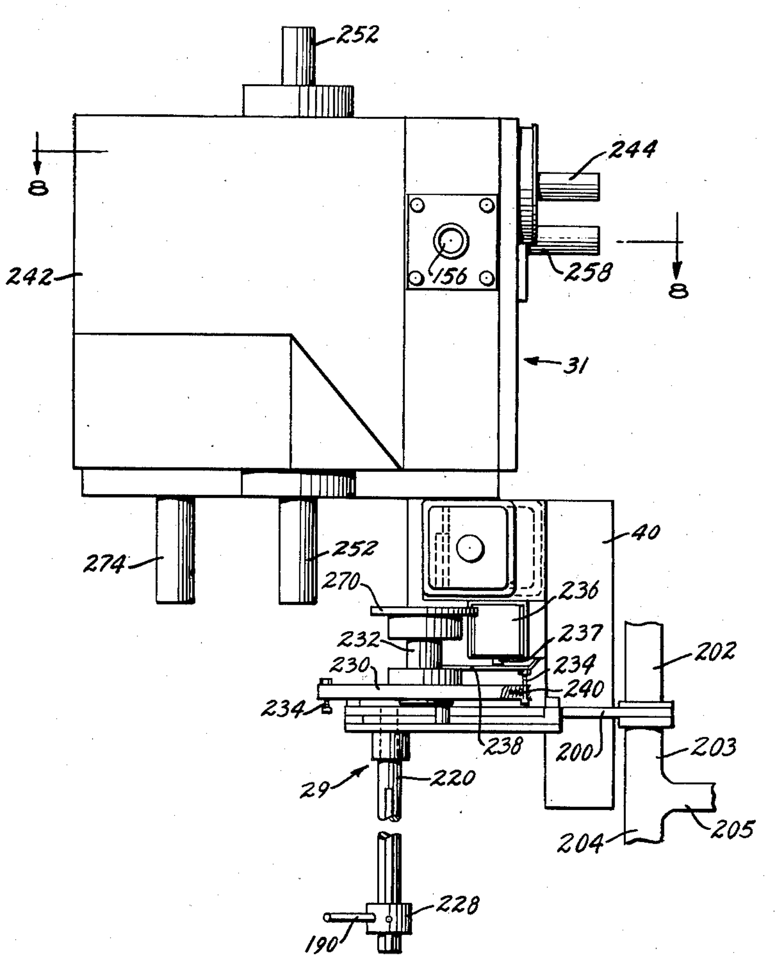
Fig. 7 is an elevational view, from the line indicated 7—7 of Fig. 2D, of the gear box of the apparatus, also showing its vacuum and bag kick-out controlling memory unit.

Reference should be had to Figs. 2B and 7, in connection with the vacuum valve unit 29. Its function is to cut off vacuum in a longitudinally forward portion of each of the front and rear vacuum manifolds 21, 22 (which are internally partitioned to this end) in the event an electrical signal is received from an appropriate detector mechanism (not part of the invention), such signal indicating a defective bag or improper bag content. Vacuum cut-off frees the bag in question from the grip of the belts 17, 18, for ejection by the rod 190 of kick-out mechanism 27. A further function of the valve unit 29 is to mechanically operate the kick-out rod.

The unit 29 comprises a horizontal, specially contoured, flat valve plate 200 which is interposed between a main vacuum supply line, schematically shown in Fig. 7 and designated 202, and a further vacuum supply line 203. The line 203 in turn has branch conduits 204, 205 leading respectively to fittings 207, 208 which communicate with the longitudinally forward zones of the respective front and rear vacuum manifolds 21, 22, i.e., forwardly of partitions 210 which seal off those zones from the remainder of the respective manifolds. As indicated above, manifolds are constructed of air tight flexible material, being suitably mounted by the bars 114, 114′ and the track mounting bars 112, 113. As for the remainder of their lengths, the two manifolds are continuously evacuated through vacuum lines 212, 213 (see also Fig. 4), which couple to a source of vacuum, generally designated 216 in Fig. 4, as does the vacuum picker tube line 82.

As shown in Figs. 2B and 7 the valve plate 200 has a somewhat elongated, generally elliptical port 218 therethrough which is normally in register with the main vacuum line 202 and an aligned end of the line 203. Valve plate 200 is fixed on a vertical spindle 220 appropriately journaled by the framework, and a coil spring 222 acts on the plate to urge it counterclockwise about this spindle axis, i.e. in a direction to register the port 218 with the vacuum lines 202, 203. Its movement away from this position is controlled by the memory device 30, as will be described.

As stated above, it is another function of the valve mechanism 29 to operate the kick-out unit 27 simultaneously with the interruption of vacuum in the forward zones of the manifolds 21, 22. To this end, valve plate 200 is provided with an integral vertically offset and radially outwardly curved cam nose or rise 224 which projects horizontally away from the pivot spindle 220 of the plate and then merges inwardly into a gradually rounded contour at 226.

In action, the rise 224 is operated by the memory device 30 to swing the valve plate 200 clockwise, thus breaking vacuum in the branch lines 204, 205 and forward zones of manifolds 21, 22, respectively. At the same time the bag kick-out rod 190 is swung clockwise as viewed in Fig. 2B, inasmuch as it is fixedly connected by an offset end collar at 228 to the lower end of valve plate pivot spindle 220. As the memory device 30 becomes effective on the gradually rounded cam surface 226, the spring 222 is permitted to swing valve plate 200 counterclockwise sufficiently to return the kick-off finger to its inoperative position of Fig. 2, but not enough as yet to register the valve port 218 with the vacuum lines 202, 203. This takes place only when the valve unit 29 is freed from the influence of the memory device 30.

*Memory device*

The memory device 30 is shown schematically in Figs. 2 and 7. It is of a conventional type, comprising a circular disk 230 secured on a vertical shaft 232 which is journaled by and projects from the gear box 31. Disk 230 is apertured at diametrically opposed points to slidably receive headed pins 234. A fixedly mounted solenoid 236 has its plunger 237, which is spring urged upward, connected to a fixedly mounted finger 238, extending to the radius of the pins 234, and the solenoid 236 is wired to an appropriate defect detector unit (not shown but mentioned above). Such unit is of a character to forward an electrical signal amplified or otherwise, in the event of an insufficient bag charge, a bag defect or the like.

Upon energization of solenoid 236 in this fashion, the end of finger 238 engages and axially shifts downward one of the pins 234 relative to disk 230, and a spring urged ball detent 240 on the disk 230 yieldably maintains the pin 234 in either a projected or withdrawn position. As thus projected, the pin 234, whose circular orbit is denoted 0 in Fig. 2B, will engage cam rise 224 of valve plate 200 when it reaches the same, shifting the plate counterclockwise. This cuts off manifold vacuum and operates bag kick-out device 27 in the way described above, and the defective bag is released and displaced from the line.

A fixed reset cam (not shown) is engaged by the projected pin 234, after such valve and kick-out operation, to restore the pin to a withdrawn, inoperative position.

*Gear box*

Figs. 2, 2B, 2D and 7 through 11 should be referred to for structure and function of the contents of the gear box 31. It has an appropriately shaped casing 242, in which are mounted the various gear, cam and linkage provisions by which components of the apparatus which are not independently driven are operated. Of these provisions, the reference numeral 244 designates a power input shaft, which, as shown in Fig. 2, is driven through pulleys and belting, generally designated 246, from an electric motor 248. Shaft 244 operates a worm (not shown) within the casing 242, which worm drivingly engages a worm gear 250 secured on a main drive shaft 252 journaled in the gear box.

It is to the drive shaft 252 that the toothed pulley 149 which powers the rear timing belt 18 is coaxially secured, externally of casing 242.

In the interest of simplicity, reference numerals designating shafting are, in certain of the figures, applied to the respective axes of shafts which are omitted and in Figs. 2, 2B, 2D and 8 gear outlines are mainly indicated only by their pitch circles.

A small 45° helix pinion 254 is secured on main drive shaft 252, meshing with a gear 256 on the shaft 186, which shaft, as indicated above, laterally extends externally of the casing and has secured thereon the lobed control cam 185 for the packer blade 180 of bag packer unit 26. As shown in Fig. 2, it may also have secured thereon a sprocket 260 by which a chain type belt conveyor and a weigher unit (not germane to the invention) may be driven.

Main drive shaft 252 also has secured thereon a spur gear 262 which is drivingly connected, by an idler couple 264, 266, with a further spur gear 268 fixed on the memory disk or wheel shaft 232, which parallels the main drive shaft 252. As stated, the memory disk 230 is fixed on shaft 232 externally of the gear casing 242, as is a sprocket 270 which may be employed to drive a sealer chain for the sealer 36 of Fig. 1. The invention does not deal with these details.

The reference numeral 272 designates (Figs. 8 and 10) a spur gear which meshes directly with the main drive shaft gear 262, the gear 272 being secured on a vertically journaled shaft 274, to which the toothed driving pulley 147 for the front vacuum timing belt 17 is coaxially secured, externally of the gear box casing 242. As stated, the driving pulley 149 for the rear timing belt 18 is secured directly on the main drive shaft 252. Thus both belts 17, 18 have positive drive at equal speed, they and their respective driving gears 272 and 262 being of equal size.

The reference numeral 276 designates a circular plate cam fixed on shaft 252 and having a cam groove 278 in a face thereof, the groove contour being indicated in Fig. 8. As shown in Figs. 8 and 11, an oscillatory arm 280 is appropriately journaled within the gear box 31, as by ball bearings and a vertical pivot pin 282. This arm carries a cam follower roller 284 medially of its length which rides in the cam groove 278, and the free end of the arm is pivotally connected to one end of a short driver link 286. The opposite end of link 286 is pivotally connected at 288 to the reciprocatory rod 156 by which the bag filler hopper or funnel 24 is driven.

The shape of cam 276 is such that, upon rotation of main drive shaft 252, the linkage comprising follower roller 284, arm 280 and link 286 drives the rod 156 and funnel 24 in the direction of travel of the bag being filled, at the same speed as the bag, then returns the funnel in the opposite direction with a much more rapid stroke. For example, the funnel 24 will travel seven inches with the bag in the forward direction and then return fully in the opposite direction during about a two inch travel of the bag it previously filled.

*Vacuum belt, guide and manifold unit*

Referring now to Figs. 12 through 19 of the drawings, the continuous timing belt feed unit 16, of which the vacuum timer belts 17, 18, the guide tracks 19, 20 and the vacuum manifolds 21, 22 are the major components, constitutes two assemblies, front and rear, which are generally similar. Each comprises an elongated manifold housing 290 of an appropriate flexible air tight material, in the cross sectional outline represented in Figs. 15 and 16. The housings are braced along the length thereof by flexible tracks 19, 20, being further rigidly braced medially by the bars 112, 113 by which the guide tracks are mounted to the longitudinal adjusting braces 114, 114'. This leaves the ends of the track and manifold free for flexure, as shown in dotted line, to vary the belt spacing. The nylon tracks 19, 20 have a high degree of wear resistance, as well as the needed flexibility without flimsiness or vertical whip at the ends thereof.

Each track provides an elongated internal chamber 291 receiving the vacuum timer belt, the front belt 17 being shown in Figs. 15 and 16. A series of screws 292 secure the tracks 19, 20 to the respective mounting bars 112, 113. Vacuum is communicated between manifolds 21, 22 and the interior of the tracks through openings 293 which are conveniently afforded by tubular rivets 294 mounting the tracks to the manifolds along their entire length.

The belts 17, 18 are each provided with a series of longitudinally spaced vacuum apertures 298 extending therethrough, and the inner portion of each belt is formed to provide driving teeth 299 engageable with the respective toothed pulleys of the apparatus. At spaced intervals the belts are provided with adjustably slidable sealing elements or plugs 300, which may be selectively positioned in relation to one another, in accordance with the width of the bag B being fed.

Thus in a typical installation, the plugs 300 will be arranged to provide successive series of perforated sections between sealing plugs on 9" centers, enabling it to readily handle bags up to 8½" in width. The travel of the thus defined sections is coordinated with the operation of the magazine or bag supply unit 10 and picker 11, since belt 17 drives the crank 78 and connecting rod 74 which actuate picker arm 12, thus to insure proper placement of the successive bags at the sealed-off sections. The belt-track-manifold unit 16 as described is a relatively inexpensive structure enabling proper application of vacuum to the belt and adjustment of the belts in the lateral sense with a minimum of difficulty.

As indicated above, the forward sections of the manifold 21, 22, specially designated 302, 303 respectively, are evacuated by the vacuum lines 204, 205 respectively, running to the fittings 207, 208. As subdivided from forward sections 302, 303, the remaining portions of the respective manifolds, designated 304 and 305, respectively, are continuously evacuated by the vacuum lines 212, 213 (see Figs. 2D and 4), which couple to the manifold fittings 214.

*Operation*

The operation of the individual major instrumentalities of the apparatus has been described and does not require repetition. In the operation of the apparatus as a whole, the bag manifold or supply device 10 insures the presence of bags B for pick-off by the head 13 of the bag picker unit 11, the sheet metal dividers 63 subdividing the groups of bags and its rapid vibratory action advancing the groups in a well distributed way forwardly to the pick-off point, at which the divider falls through the forward opening 60 in the magazine floor 53.

Picker head 13 engages the endmost bag under substantial pressure, and thus vacuum-separates that bag from the remainder of the stack. The head swings the bag to a delivery point adjacent rear vacuum belt 18, whereupon the vacuum in the head is cut off and the belt 18 assumes control, gripping the bag B in the zone between a pair of its sealing plugs 300.

The bag thus proceeds between the belts 17, 18, by which it is gradually spread at its mouth. The filling hopper 24 of the funnel unit 23 travels with the bag, being reciprocably operated by rod 156 from the gear box 31; and the agitating rolls 160 insure against clogging in the hopper as the potato chips descend into the bag B.

Positive drive of the belts 17, 18 is had at the pulleys 147 and 149, and the belt 17 serves as driver for the picker operating crank 78, as well as for the cam 197 for the bag closing unit 28.

The filling of the bags B is assisted by the tamping action of packer rod 181 of the unit 26, as well as by the vibratory action of trough 32 along which the bottom of the bag slides. Defective bags are kicked off the line by the arm 190 of the kick-out unit 27, which is under the control of the memory unit 30, as is the cut off of vacuum in the forward vacuum manifold portions 302 and 303 to release the bag for kick-off.

With the completion of the operations thus described, the filled bag proceeds, under the control of feed mechanism with which the invention is not concerned, to appropriate sealing and disposal instrumentalities.

What I claim as my invention is:

1. Apparatus for feeding and opening bags or like flat articles, comprising a pair of endless flexible belts having means driving the same for travel in face to face relation, said belts being engageable with opposite sides of an article to grip the same, tracks guiding said belts along adjacent reaches thereof, and means to adjust the lateral spacing of said belts by adjusting the lateral position of at least one of said tracks, the adjusted track being flexible to permit such adjustment.

2. Apparatus for feeding and opening bags or like flat articles, comprising a pair of endless flexible belts having means driving the same for travel in face to face relation, said belts being apertured for the transmission of vacuum and being engageable with opposite sides of an article to grip the same under vacuum, recessed tracks guiding said belts along adjacent reaches thereof, vacuum manifolds connected to said tracks in communication with the recesses thereof to cause vacuum to act through said belts, and means to adjust the lateral spacing of said belts by adjusting the lateral position of at least one of said tracks, the adjusted track being flexible to permit such adjustment.

3. Apparatus for feeding and opening bags or like flat articles, comprising a pair of endless flexible belts having means driving the same for travel in face to face relation, said belts being apertured for the transmission of vacuum and being engageable with opposite sides of an article to grip the same under vacuum, recessed tracks guiding said belts for divergent travel along adjacent reaches thereof, vacuum manifolds connected to said tracks in communication with the recesses thereof to cause vacuum to act through said belts, and means to adjust the lateral spacing of said belts by adjusting the lateral position of at least one of said tracks, the adjusted track and its connected manifold being flexible to permit such adjustment.

4. Apparatus for feeding and opening bags or like flat articles, comprising a pair of endless flexible timing belts which are substantially continuous as to their surfaces in the direction of the length thereof and have toothed means driving the same for travel in face to face relation, said belts being engageable with opposite sides of an article to grip the same, and tracks guiding said belts along adjacent reaches thereof, at least one of said timing belts having engagement with a toothed part of said apparatus to drive the same.

5. Apparatus for feeding and opening bags or like flat articles, comprising a pair of endless flexible timing belts which are substantially continuous as to their surfaces in the direction of the length thereof and have toothed means driving the same for travel in face to face relation, said belts being engageable with opposite sides of an article to grip the same, tracks guiding said belts along adjacent reaches thereof, and means to adjust the lateral spacing of said belts by adjusting the lateral position of at least one of said tracks, at least one of said timing belts having engagement with a toothed part of said apparatus to drive the same.

6. In apparatus for filling bags and like containers, means to transport the containers in longitudinal succession, open ends up, and a funnel unit to discharge material into said containers, said unit having means to reciprocate the same over and parallel to the travel of the containers, said funnel unit comprising a hopper and a non-circular filler roll received in and paralleling a wall of said hopper to constitute a part of said wall.

7. In apparatus for filling bags and like containers, means to transport the containers in longitudinal succession, open ends up, and a funnel unit to discharge material into said containers, said unit having means to reciprocate the same over and parallel to the travel of the containers, with a substantially faster return stroke opposite to the direction of container travel than in that direction, said funnel unit comprising a hopper and a noncircular filler roll received in and paralleling a wall of said hopper to constitute a part of said wall.

8. In apparatus for filling bags and like containers, means to transport the containers in longitudinal succession, open ends up, and a funnel unit to discharge material into said containers, said unit having means to reciprocate the same over and parallel to the travel of the containers, said funnel unit comprising a hopper and a non-circular filler roll received in and paralleling a wall of said hopper to constitute a part of said wall, said reciprocating means moving said hopper axially relative to said filler roll.

9. In apparatus for filling bags and like containers, means to transport the containers in longitudinal succession, open ends up, and a funnel unit to discharge material into said containers, said unit having means to reciprocate the same over and parallel to the travel of the containers, with a substantially faster return stroke opposite to the direction of container travel than in that direction, said funnel unit comprising a hopper and a non-circular filler roll received in and paralleling a wall of said hopper to constitute a part of said wall, said reciprocating means moving said hopper axially relative to said filler roll.

10. Apparatus for filling bags and like containers, comprising means for transporting the containers in succession with an open mouth up, filling means including a hopper discharging material into said containers, means to reciprocate said hopper in the direction of container travel, said hopper having a filler roll constituting a portion of a wall thereof and being reciprocated axially of said roll, and a packer unit having means operating the same in timed relation to the movement of the container to impart packing strokes to material in the containers during the movement of the latter.

11. Apparatus for filling bags and like containers, comprising means for transporting the containers in succession with an open mouth up, filling means discharging material into said containers, and means to initiate closing of the container mouth, including a closer finger and means to insert the same into said mouth and perform a reciprocating stroke therein during movement of the container.

12. Apparatus for filling bags and like containers, comprising means for transporting the containers in succession with an open mouth up, filling means including a hopper discharging material into said containers, means to reciprocate said hopper in the direction of container travel, said hopper having a filler roll constituting a portion of a wall thereof and being reciprocated axially of said roll, a packer unit having means operating the same in timed relation to the movement of the container to impart packing strokes to material in the containers during the movement of the latter, a vibratory support along which said containers move and by which they are agitated to assist packing, and means to initiate closing of the container mouth, including a closer finger and means to insert the same into said mouth and perform a reciprocatory stroke therein during movement of the container.

13. Apparatus for filling bags and like containers comprising a conveyor having means to grip a container while advancing the same, a container ejector unit adapted to displace a container from the path of its advance by said conveyor, a memory device operated in timed relation to said conveyor and in response to an external signal to actuate said container ejector unit, and means similarly actuated by said device in response to said signal to release a container from said conveyor gripping means for ejection by said ejector unit.

14. Apparatus for filling bags and like containers comprising a conveyor having vacuum controlled means to grip and open a container while advancing the same, a container ejector unit adapted to displace a container from the path of its advance by said conveyor, a memory device operated in timed relation to said conveyor and in response to an external signal to actuate said container ejector unit, and means similarly actuated by said device in response to said signal to cut off vacuum controlling said container gripping conveyor and release a container from said conveyor for ejection by said ejector unit.

15. Apparatus for filling bags and like containers comprising container conveying means including a conveyor having vacuum controlled means to grip a container while advancing the same, a memory device operated in timed relation to said conveyor and in response to an external signal, and means actuated by said device in response to said signal to cut off vacuum controlling said container gripping conveyor and release a container therefrom.

16. Apparatus in accordance with claim 15, in which said container conveying means comprises an endless flexible belt having a longitudinally extending series of vacuum transmitting apertures therethrough and a vacuumized guide track through which said belt travels with a side thereof exposed for vacuum gripping engagement with a container, and sealing means adjustable on said belt to define a series of apertures through which vacuum is transmitted to a container in traversing said track.

17. Apparatus in accordance with claim 15, in which said container conveying means comprises an endless flexible belt having a longitudinally extending series of vacuum transmitting apertures therethrough, a vacuumized guide track through which said belt travels with a side thereof exposed for vacuum gripping engagement with a container, said belt being flexible to enable bodily lateral adjustment thereof along with said belt.

18. Apparatus in accordance with claim 15, in which said container conveying means comprises an endless flexible belt having longitudinally extending series of vacuum transmitting apertures therethrough, a vacuumized guide track through which said belt travels with a side thereof exposed for vacuum gripping engagement with a container, and sealing means adjustable on said belt to define a series of apertures through which vacuum is transmitted to a container in traversing said track, said belt guide track being flexible to enable bodily lateral adjustment thereof along with said belt.

19. Apparatus as described comprising an endless flexible belt which is substantially continuous in the direction of the length thereof, said belt having longitudinally spaced driving teeth along one surface thereof and longitudinally spaced apertures therein which open to the opposite surface for application of vacuum from a vacuum source to an object at said last named surface, means engaging said teeth to drive said belt, and means defining a fixed hollow guide track of substantial length through which said belt passes, said belt and track being in air sealing relation to one another and the track being adapted to be connected to said vacuum source.

20. Apparatus as described comprising an endless flexible belt which is substantially continuous in the direction of the length thereof, said belt having longitudinally spaced driving teeth along one surface thereof and longitudinally spaced apertures therein which extend from said surface and open to the opposite surface for application of vacuum from a vacuum source to an object at said last named surface, means engaging said teeth to drive said belt, and means defining a fixed hollow guide track of substantial length through which said belt passes, said belt and track being in air sealing relation to one another and the track being adapted to be connected to said vacuum source.

21. Apparatus as described comprising an endless flexible belt which is substantially continuous in the direction of the length thereof, said belt having longitudinally spaced driving teeth along one surface thereof and longitudinally spaced apertures therein which open to the opposite surface for application of vacuum from a vacuum source to an object at said last named surface, said belt having sealing means adjustable longitudinally thereof to seal off the ends of predetermined series of said apertures, means engaging said teeth to drive said belt, and means defining a fixed hollow guide track of substantial length through which said belt passes, said belt and track being in air sealing relation to one another and the track being adapted to be connected to said vacuum source.

22. Apparatus as described comprising an endless flexible belt which is substantially continuous in the direction of the length thereof, said belt having longitudinally spaced driving teeth along one surface thereof and longitudinally spaced apertures therein which open to the opposite surface for application of vacuum from a vacuum source to an object at said last named surface, a fixed hollow guide track along and through which said belt is guided for longitudinal travel with the belt and track in air sealing relation to one another, said track having vacuum transmission openings therein to communicate with said apertures, and a vacuum manifold with which said track is in communication.

23. Apparatus as described comprising an endless flexible belt which is substantially continuous in the direction of the length thereof, said belt having longitudinally spaced driving teeth along one surface thereof and longitudinally spaced apertures therein which open to the opposite surface for application of vacuum from a vacuum source to an object at said last named surface, a fixed hollow guide track along and through which said belt is guided for longitudinal travel with the belt and track in air sealing relation to one another, said track having vacuum transmission openings therein to communicate with said aperture and a vacuum manifold with which said track is in communication, said track being fabricated of flexible material for lateral adjustment, said belt having sealing means adjustable longitudinally thereof to seal off the ends of predetermined series of said apertures.

24. Apparatus for filling bags and like containers, comprising means for transporting the containers in succession with an open mouth up, filling means including a hopper discharging material into said containers, means to reciprocate said hopper in the direction of container travel, thereby to enable said hopper to discharge to a container during the travel thereof, and a packer unit having means operating the same in timed relation to the movement of the container to impart packing strokes to material in the containers during the movement of the latter.

25. Apparatus for filling bags and like containers, comprising means for transporting the containers in succession with an open mouth up, filling means including a hopper discharging material into said containers, means to reciprocate said hopper in the direction of container travel, thereby to enable said hopper to discharge to a container during the travel thereof, a packer unit having means operating the same in timed relation to the movement of the container to impart packing strokes to material in the containers during the movement of the latter, and a vibratory support along which said containers move and by which they are agitated during movement to assist packing.

26. Apparatus for feeding, opening and filling bags, comprising a pair of endless flexible, driven belts which are substantially continuous in the direction of the length thereof, said belts being disposed with elongated reaches thereof in face-to-face relation and being adapted to engage opposite surfaces of said bags in a flat condition of the latter, and having means to apply vacuum through said reaches to cause the latter to grip a bag so engaged, means guiding said belts along said reaches to cause relative spreading of the latter with consequent opening of said bags during said travel thereof, and a filling unit to discharge material into said bags as so spread during said travel.

27. Apparatus for feeding, opening and filling bags, comprising a pair of endless flexible, driven belts which are substantially continuous in the direction of the length thereof, said belts being disposed with elongated reaches thereof in face-to-face relation and being adapted to engage opposite surfaces of said bags in a flat condition of the latter, and having means to apply vacuum through said reaches to cause the latter to grip a bag so engaged, at least one of said belts having toothed means engageable with a part of said apparatus for driving the same for travel in said face-to-face relation, means guiding said belts along said reaches to cause relative spreading of the latter with consequent opening of said bags during said travel thereof, and a filling unit to discharge material into said bags as so spread during said travel.

28. Apparatus for feeding, opening and filling bags, comprising a pair of endless flexible, driven belts which are substantially continuous in the direction of the length thereof, said belts being disposed with elongated reaches thereof in face-to-face relation and being adapted to engage opposite surfaces of said bags in a flat condition of the latter, and having means to apply vacuum through said reaches to cause the latter to grip a bag so engaged, means guiding said belts along said reaches to cause relative spreading of the latter with consequent opening of said bags during said travel thereof, and a filling unit to discharge material into said bags as so spread during said travel, said unit having means to move the same over and parallel to the path of bag travel to discharge said material to said bags.

29. Apparatus for feeding, opening and filling bags, comprising a pair of endless flexible, driven belts which are substantially continuous in the direction of the length thereof, said belts being disposed with elongated reaches thereof in face-to-face relation and being adapted to engage opposite surfaces of said bags in a flat condition of the latter, and having means to apply vacuum through said reaches to cause the latter to grip a bag so engaged, at least one of said belts having toothed means engageable with a part of said apparatus for driving the same for travel in said face-to-face relation, means guiding said belts along said reaches to cause relative spreading of the latter with consequent opening of said bags during said travel thereof, and a filling unit to discharge material into said bags as so spread during said travel, said unit having means to move the same over and parallel to the path of bag travel to discharge said material to said bags.

30. Apparatus for feeding and opening bags, comprising means for initially gripping and advancing a series of said bags in a flat condition in a direction paralleling the plane thereof, with open ends of said bags facing upwardly, and for opening said ends during said advance under vacuum applied thereto, said means including at least one endless flexible, driven belt which is substantially continuous in the direction of its length and is disposed with a reach thereof traveling in facing relation to an adjacent upright flat surface of said bags for engagement with said surface in said flat condition, said belt having means to apply vacuum through the same to cause a bag so engaged to be gripped, and means controlling the direction of said belt reach to cause spreading of the mouth of bags so engaged and gripped, during the advance of the latter, in the direction transverse of the upright gripped bag surface.

31. Apparatus for feeding and filling bags, comprising means for initially gripping and advancing a series of said bags in a flat condition in a direction paralleling the plane thereof, with open ends of said bags facing upwardly, and for opening said ends during said advance under vacuum applied thereto, said means including at least one endless flexible, driven belt which is substantially continuous in the direction of its length and is disposed with a reach thereof traveling in facing relation to an adjacent upright flat surface of said bags for engagement with said surface in said flat condition, said belt having means to apply vacuum through the same to cause a bag so engaged to be gripped, and means controlling the direction of said belt reach to cause spreading of the mouth of bags so engaged and gripped, during the advance of the latter, in the direction transverse of the upright gripped bag surface, and filling means for said bags having means to drive the same longitudinally of and above the path of advance for the discharge of material from said filling means to said spread bags during the advance thereof.

32. Apparatus for filling bags and like containers, comprising means for transporting the containers in succession with an open mouth up, means acting through said mouth on the content of said container to pack the latter during said transportation, and means also acting within said container mouth to initiate closing of the container mouth during said transportation by mechanically engaging and spreading the forward and rearward ends of the mouth relative to one another.

33. Apparatus for filling bags and like containers, comprising means for transporting the containers in succession with an open mouth up, means acting through said mouth on the content of said container to pack the latter during said transportation, and means to initiate closing of the container mouth during said transportation, including a closure finger and means to insert the same into said open mouth and perform a reciprocating stroke therein during said transportation of the container.

References Cited in the file of this patent

UNITED STATES PATENTS

| | | |
|---|---|---|
| 1,073,741 | Cox | Sept. 23, 1913 |
| 1,909,319 | Taylor | May 16, 1933 |
| 1,914,369 | Hohl | June 30, 1933 |
| 1,957,621 | Styron | May 8, 1934 |
| 1,998,287 | Pierson et al. | Apr. 16, 1935 |
| 2,014,555 | Chikian | Sept. 17, 1935 |
| 2,036,643 | Richard | Apr. 7, 1936 |
| 2,272,258 | Allen | Feb. 10, 1942 |
| 2,423,358 | Wheaton et al. | July 1, 1947 |
| 2,425,210 | Stokes | Aug. 5, 1947 |
| 2,428,192 | Berch | Sept. 30, 1947 |
| 2,444,504 | Grogan | July 6, 1948 |
| 2,538,242 | Hannon | Jan. 16, 1951 |
| 2,753,980 | Ballard | July 10, 1956 |
| 2,833,097 | Petrea et al. | May 6, 1958 |